(12) United States Patent
Kuge et al.

(10) Patent No.: US 12,035,409 B2
(45) Date of Patent: *Jul. 9, 2024

(54) TERMINAL DEVICE, MME, COMMUNICATION CONTROL METHOD FOR TERMINAL DEVICE, AND COMMUNICATION CONTROL METHOD FOR MME

(71) Applicant: SHARP KABUSHIKI KAISHA, Sakai (JP)

(72) Inventors: Yoko Kuge, Sakai (JP); Masafumi Aramoto, Sakai (JP); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,198

(22) Filed: Feb. 12, 2021

(65) Prior Publication Data
US 2021/0168583 A1    Jun. 3, 2021

Related U.S. Application Data

(63) Continuation of application No. 15/750,590, filed as application No. PCT/JP2016/073362 on Aug. 8, 2016, now Pat. No. 10,924,914.

(30) Foreign Application Priority Data

Aug. 7, 2015 (JP) .................................. 2015-156693

(51) Int. Cl.
*H04W 8/06* (2009.01)
*H04W 12/04* (2021.01)
(Continued)

(52) U.S. Cl.
CPC .............. *H04W 8/06* (2013.01); *H04W 12/04* (2013.01); *H04W 12/06* (2013.01); *H04W 28/06* (2013.01);
(Continued)

(58) Field of Classification Search
CPC ....... H04W 8/06; H04W 76/11; H04W 76/27; H04W 12/04; H04W 12/06; H04W 60/00;
(Continued)

(56) References Cited

U.S. PATENT DOCUMENTS

2007/0297367 A1* 12/2007 Wang .................. H04L 63/0414
370/331
2010/0238990 A1    9/2010 Rao
(Continued)

FOREIGN PATENT DOCUMENTS

WO    WO 2011/119680 A2    9/2011
WO    WO 2012/136374 A2    10/2012
(Continued)

OTHER PUBLICATIONS

3GPP TR 23.720 V0.1.0 (Jul. 2015); 3rd Generation Partnership Project; Technical Specification Group Services and System Aspects; Architecture enhancements for Cellular Internet of Things; (Release 13), 2015, pp. 1-54.
(Continued)

*Primary Examiner* — Dinh Nguyen
(74) *Attorney, Agent, or Firm* — Birch, Stewart, Kolasch & Birch, LLP

(57) ABSTRACT

A transmission and/or reception unit is included and configured to transmit an ATTACH REQUEST message including identification information for requesting communication of a NAS message including user data to an MME in a core network, configured to receive an ATTACH ACCEPT message including identification information indicating accep-
(Continued)

tance of the communication of the NAS message from the MME, and configured to transmit the NAS message to the MME after receiving the ATTACH ACCEPT message. This provides establishment of a PDN connection for performing machine type communication in which a small data packet is transmitted at a low frequency, and a communication control method.

2 Claims, 21 Drawing Sheets

(51) Int. Cl.
| | |
|---|---|
| *H04W 12/06* | (2021.01) |
| *H04W 28/06* | (2009.01) |
| *H04W 52/02* | (2009.01) |
| *H04W 60/00* | (2009.01) |
| *H04W 76/10* | (2018.01) |
| *H04W 76/11* | (2018.01) |
| *H04W 76/27* | (2018.01) |
| *H04L 9/40* | (2022.01) |
| *H04W 4/70* | (2018.01) |
| *H04W 84/12* | (2009.01) |

(52) U.S. Cl.
CPC ....... *H04W 52/0229* (2013.01); *H04W 60/00* (2013.01); *H04W 76/10* (2018.02); *H04W 76/11* (2018.02); *H04W 76/27* (2018.02); H04L 63/0876 (2013.01); *H04W 4/70* (2018.02); *H04W 84/12* (2013.01)

(58) Field of Classification Search
CPC ....... H04W 4/70; H04W 84/12; H04W 28/06; H04W 52/0229; H04W 76/10; H04W 64/00; H04L 63/0876; Y02D 30/70
See application file for complete search history.

(56) References Cited

U.S. PATENT DOCUMENTS

| | | | |
|---|---|---|---|
| 2011/0075675 A1* | 3/2011 | Koodli | H04L 61/2528 370/401 |
| 2012/0039304 A1* | 2/2012 | Kim | H04W 28/08 370/332 |
| 2012/0213140 A1 | 8/2012 | Olsson et al. | |
| 2012/0264451 A1 | 10/2012 | Kim et al. | |
| 2013/0029639 A1* | 1/2013 | Lee | H04W 12/06 455/411 |
| 2013/0203414 A1 | 8/2013 | Zong et al. | |
| 2014/0016614 A1* | 1/2014 | Velev | H04W 4/70 370/331 |
| 2014/0355590 A1 | 12/2014 | Cho et al. | |
| 2016/0156676 A1* | 6/2016 | Verin | H04L 65/4084 709/228 |

FOREIGN PATENT DOCUMENTS

| | | |
|---|---|---|
| WO | WO 2012/154325 A1 | 11/2012 |
| WO | WO 2013/017849 A2 | 2/2013 |
| WO | WO 2013/130314 A1 | 9/2013 |

OTHER PUBLICATIONS

Advisory Action issued in corresponding U.S. Appl. No. 15/750,590 dated Jan. 24, 2020.
English translation of International Preliminary Report on Patentability issued in corresponding International Application No. PCT/JP2016/073362 dated Feb. 22, 2018.
Final Office Action issued in corresponding U.S. Appl. No. 15/750,590 dated Aug. 22, 2019.
Non-Final Office Action issued in corresponding U.S. Appl. No. 15/750,590 dated Nov. 29, 2018.
Notice of Allowance issued in copending U.S. Appl. No. 15/750,590 dated Oct. 15, 2020.
Samsung, "Impact of uplink TBS limitation of low cost MTC UE," 3GPP TSG-RAN WG2#86, R2-142465, Seoul, Korea, May 19-23, 2014, XP50793592, pp. 1-3.

\* cited by examiner

| |
|---|
| IMSI |
| IMSI-unauthenticated-indicator |
| MSISDN |
| MM State |
| GUTI |
| ME Identity |
| Tracking Area List |
| TAI of last TAU |
| ECGI |
| E-UTRAN Cell Identity Age |
| CSG ID |
| CSG membership |
| Access mode |
| Authentication Vector |
| UE Radio Access Capability |
| MS Classmark 2 |
| MS Classmark 3 |
| Supported Codecs |
| UE Network Capability |
| MS Network Capability |
| UE Specific DRX Parameters |
| Selected NAS Algorithm |
| eKSI |
| K_ASME |
| NAS Keys and COUNT |
| Selected CN operator id |

FIG. 7

| |
|---|
| Recovery |
| Access Restriction |
| ODB for PS parameters |
| APN-OI Replacement |
| MME IP address for S11 |
| MME TEID for S11 |
| S-GW IP address for S11/S4 |
| S-GW TEID for S11/S4 |
| SGSN IP address for S3 |
| SGSN TEID for S3 |
| eNodeB Address in Use for S1-MME |
| eNB UE S1AP ID |
| UE S1AP ID |
| Subscribed UE-AMBR |
| UE-AMBR |
| EPS Subscribed Charging Characteristics |
| Subscribed RFSP Index |
| RFSP Index in Use |
| Trace reference |
| Trace type |
| Trigger id |
| OMC identity |
| URRP-MME |
| CSG Subscription Data |
| LIPA Allowed |
| Subscribed Periodic RAU/TAU Timer |

FIG. 8

| |
|---|
| MPS CS priority |
| MPS EPS priority |
| Voice Support Match Indicator |
| Homogenous Support of IMS Voice over PS Sessions |

FIG. 9

| |
|---|
| APN in Use |
| APN Restriction |
| APN Subscribed |
| PDN Type |
| IP Address(es) |
| EPS PDN Charging Characteristic |
| APN-OI Replacement |
| SIPTO permissions |
| Local Home Network ID |
| LIPA permissions |
| WLAN offloadability |
| VPLMN Address Allowed |
| PDN GW Address in Use (CONTROL INFORMATION) |
| PDN GW TEID for S5/S8 (CONTROL INFORMATION) |
| MS Info Change Reporting Action |
| CSG Information Reporting Action |
| Presence Reporting Area Action |
| EPS subscribed QoS profile |
| Subscribed APN-AMBR |
| APN-AMBR |
| PDN GW GRE Key for uplink traffic (USER DATA) |
| Default bearer |
| low access priority |

FIG. 10

| |
|---|
| EPS Bearer ID |
| TI |
| S-GW IP address for S1-u |
| S-GW TEID for S1u |
| PDN GW TEID for S5/S8 (user plane) |
| PDN GW IP address for S5/S8 (user plane) |
| EPS bearer QoS |
| TFT |

| EPS AS SECURITY CONTEXT |
|---|
| EPS NAS SECURITY CONTEXT |

FIG. 12B

| cryptographic key |
|---|
| Next Hop parameter (NH) |
| Next Hop Chaining Counter parameter (NCC) |
| identifiers of the selected AS level cryptographic algorithms |

FIG. 12C

| K_ASME |
|---|
| UE security capabilitie |
| NAS COUNT |

FIG. 12D

| Emergency Access Point Name (em APN) |
|---|
| Emergency QoS profile |
| Emergency APN-AMBR |
| Emergency PDN GW identity |
| Non-3GPP HO Emergency PDN GW identity |

| |
|---|
| IMSI |
| IMSI-unauthenticated-indicator |
| ME Identity |
| MSISDN |
| Selected CN operator id |
| MME TEID for S11 |
| MME IP address for S11 |
| S-GW TEID for S11/S4 |
| S-GW IP address for S11/S4 |
| SGSN IP address for S4 |
| SGSN TEID for S4 |
| Trace reference |
| Trace type |
| Trigger ID |
| OMC identity |
| Last known Cell ID |
| Last known Cell ID age |

FIG. 15A

| APN in Use |
|---|
| EPS PDN Charging Characteristics |
| P-GW Address in Use (CONTROL INFORMATION) |
| P-GW TEID for S5/S8 (CONTROL INFORMATION) |
| P-GW Address in Use (USER DATA) |
| P-GW GRE Key for uplink traffic (USER DATA) |
| S-GW IP address for S5/S8 (CONTROL INFORMATION) |
| S-GW TEID for S5/S8 (CONTROL INFORMATION) |
| S-GW Address in Use (USER DATA) |
| S-GW GRE Key for downlink traffic (USER DATA) |
| Default Bearer |

FIG. 15B

| EPS Bearer Id |
|---|
| TFT |
| P-GW Address in Use (user plane) |
| S-GW IP address for S5/S8 (user plane) |
| S-GW TEID for S5/S8 (user plane) |
| S-GW IP address for S1-u, S12 and S4 (user plane) |
| S-GW TEID for S1-u, S12 and S4 (user plane) |
| eNodeB IP address for S1-u |
| eNodeB TEID for S1-u |
| RNC IP address for S12 |
| RNC TEID for S12 |
| SGSN IP address for S4 (user plane) |
| SGSN TEID for S4 (user plane) |
| EPS Bearer QoS |
| Charging Id |

| IMSI |
| IMSI-unauthenticated-indicator |
| ME Identity |
| MSISDN |
| Selected CN operator id |
| RAT type |
| Trace reference |
| Trace type |
| Trigger id |
| OMC identity |

| APN in use |
| APN-AMBR |

FIG. 18A

| |
|---|
| IP Address |
| PDN type |
| S-GW Address in Use (CONTROL INFORMATION) |
| S-GW TEID for S5/S8 (CONTROL INFORMATION) |
| S-GW Address in Use (USER DATA) |
| S-GW GRE Key for downlink traffic (USER DATA) |
| P-GW IP address for S5/S8 (CONTROL INFORMATION) |
| P-GW TEID for S5/S8 (CONTROL INFORMATION) |
| P-GW Address in Use (USER DATA) |
| P-GW GRE Key for uplink traffic (USER DATA) |
| MS Info Change Reporting support indication |
| MS Info Change Reporting Action |
| CSG Information Reporting Action |
| Presence Reporting Area Action |
| BCM |
| Default Bearer |
| Default BearerEPS PDN Charging Characteristics |

FIG. 18B

| |
|---|
| EPS Bearer Id |
| TFT |
| S-GW Address in Use (USER DATA) |
| S-GW TEID for S5/S8 (USER DATA) |
| P-GW IP address for S5/S8 (USER DATA) |
| P-GW TEID for S5/S8 (USER DATA) |
| EPS Bearer QoS |
| Charging Id |

FIG. 21A

| |
|---|
| IMSI |
| EMM State |
| GUTI |
| ME Identity |
| Tracking Area List |
| last visited TAI |
| Selected NAS Algorithm |
| Selected AS Algorithm |
| eKSI |
| K_ASME |
| NAS Keys and COUNT |
| Temporary Identity used in Next update (TIN) |
| UE Specific DRX Parameters |
| Allowed CSG list |
| Operator CSG list |

FIG. 21B

| |
|---|
| APN in Use |
| APN-AMBR |
| Assigned PDN Type |
| IP Address(es) |
| Default Bearer |
| WLAN offloadability |

FIG. 21C

| |
|---|
| EPS Bearer ID |
| TI |
| EPS bearer QoS |
| TFT | ardız # TERMINAL DEVICE, MME, COMMUNICATION CONTROL METHOD FOR TERMINAL DEVICE, AND COMMUNICATION CONTROL METHOD FOR MME

CROSS-REFERENCE TO RELATED APPLICATIONS

This application is a continuation of copending U.S. application Ser. No. 15/750,590, filed Feb. 6, 2018, which is the National Phase under 35 U.S.C. § 371 of International Application No. PCT/JP2016/073362, filed on Aug. 8, 2016, which claims the benefit under 35 U.S.C. § 119(a) to Patent Application No. 2015-156693, filed in Japan on Aug. 7, 2015, all of which are hereby expressly incorporated by reference into the present application.

TECHNICAL FIELD

The present invention relates to terminal devices and the like.

This application claims priority based on JP 2015-156693 filed on Aug. 7, 2015 in Japan, the contents of which are incorporated herein in its entirety by reference.

BACKGROUND ART

The 3rd Generation Partnership Project (3GPP), which undertakes activities for standardizing recent mobile communication systems, discusses System Architecture Enhancement (SAE), which is system architecture of the Long Term Evolution (LTE). 3GPP is in the process of creating specifications for the Evolved Packet System (EPS), which realizes an all-IP architecture. Note that a core network of LTE is called an Evolved Packet Core (EPC).

Furthermore, 3GPP recently discusses a Machine to Machine (M2M) communication technology. Note that the M2M communication may be machine-machine type communication. 3GPP discusses a Cellular Internet of Things (CIoT), in particular, as a technology for supporting Internet of Things (IoT) in a cellular network of 3GPP (for example, see NPL 1).

IoT refers to a technology for connecting various devices other than IT devices such as personal computers to the Internet. Specifically, for example, CIoT may be used for managing a sensor node or the like through the Internet.

CIoT is demanded to increase the efficiency of power consumption such that a battery of a terminal can be maintained for several years, to cope with communication in an indoor or underground state, and to cope with inexpensive mass production. Furthermore, CIoT is demanded to support low data rate communication with a simple end node.

In the present specification, in this manner, a terminal, which is demanded to have low power consumption, in which data are transmitted and/or received with a low data rate, which has a low function being not required to have a complex capability, and which is allowed to be connected to a 3GPP core network, is referred to as a CIoT device.

CITATION LIST

Non Patent Literature

NPL 1: 3rd Generation Partnership Project: Technical Specification Group Services and System Aspects; Architecture enhancements for Cellular Internet of Things; (Release 13)

SUMMARY OF INVENTION

Technical Problem

As for CIoT, in order to increase the efficiency of a control signal, including a function unit having multiple functions in the core network is discussed. Specifically, providing a CIoT Serving Gateway Node (C-SGN) responsible for functions of known MME, SGW, and PGW in the core network is discussed.

3GPP discusses that a CIoT device is connected to the core network through an access network of CIoT.

Note that the core network to which the CIoT device is connected may be the known core network, may be a core network for logically divided CIoT, or may be a core network physically different from the known core network. The core network as described above is assumed to be the core network for CIoT.

However, a connection method to these core networks and a procedure for data transmission and/or reception to/from these core networks have not been made clear.

The present invention has been made in view of the above described situations, and an object is to provide a suitable attach procedure and a communication procedure in machine type communication in which a small data packet is transmitted at a low frequency.

Solution to Problem

In order to accomplish the object described above, a terminal device according to one aspect of the present invention is a terminal device which includes a transmission and/or reception unit configured to transmit an ATTACH REQUEST message including identification information for requesting communication of a Non-Access Stratum (NAS) message including user data to a Mobility Management Entity (MME) in a core network, configured to receive an ATTACH ACCEPT message including identification information indicating acceptance of the communication of the NAS message from the MME, and configured to transmit the NAS message to the MME after receiving the ATTACH ACCEPT message.

An MME according to one aspect of the present invention is a Mobility Management Entity (MME) in a core network, the MME includes a transmission and/or reception unit configured to receive an ATTACH REQUEST message including identification information for requesting communication of a Non-Access Stratum (NAS) message including user data from a terminal device, configured to transmit an ATTACH ACCEPT message including identification information indicating acceptance of the communication of the NAS message to the terminal device, and configured to receive the NAS message from the terminal device after transmitting the ATTACH ACCEPT message.

A terminal device according to one aspect of the present invention includes a transmission and/or reception unit configured to transmit an ATTACH REQUEST message including identification information indicating connection not being established to a Mobility Management Entity (MME) in a core network, configured to receive an ATTACH ACCEPT message including the identification information from the MME, and configured to transmit a Non-Access Stratum (NAS) message including user data to the MME after receiving the ATTACH ACCEPT message.

An MME according to one aspect of the present invention is a Mobility Management Entity (MME) in a core network, the MME includes a transmission and/or reception unit configured to receive an ATTACH REQUEST message including identification information indicating connection not being established from a terminal device, configured to transmit an ATTACH ACCEPT message including the identification information to the terminal device, and configured to receive a Non-Access Stratum (NAS) message including user data from the terminal device after transmitting the ATTACH ACCEPT message.

A communication control method for a terminal device according to one aspect of the present invention, the method includes the steps of: transmitting an ATTACH REQUEST message including identification information for requesting communication of a Non-Access Stratum (NAS) message including user data to a Mobility Management Entity (MME) in a core network; receiving an ATTACH ACCEPT message including identification information indicating acceptance of the communication of the NAS message from the MME; and transmitting the NAS message to the MME after receiving the ATTACH ACCEPT message.

A communication control method for an MME according to one aspect of the present invention is a communication control method for a Mobility Management Entity (MME) in a core network, the method includes the steps of: receiving an ATTACH REQUEST message including identification information for requesting communication of a Non-Access Stratum (NAS) message including user data from a terminal device; transmitting an ATTACH ACCEPT message including identification information indicating acceptance of the communication of the NAS message to the terminal device; and receiving the NAS message from the terminal device after transmitting the ATTACH ACCEPT message.

A communication control method for a terminal device according to one aspect of the present invention, the method includes the steps of: transmitting an ATTACH REQUEST message including identification information indicating connection not being established to a Mobility Management Entity (MME) in a core network; receiving an ATTACH ACCEPT message including the identification information from the MME; and transmitting a Non-Access Stratum (NAS) message including user data to the MME after receiving the ATTACH ACCEPT message.

A communication control method for an MME according to one aspect of the present invention is a communication control method for a Mobility Management Entity (MME) in a core network, the method includes the steps of: receiving an ATTACH REQUEST message including identification information indicating connection not being established from a terminal device; transmitting an ATTACH ACCEPT message including the identification information to the terminal device; and receiving a Non-Access Stratum (NAS) message including user data from the terminal device after transmitting the ATTACH ACCEPT message.

Advantageous Effects of Invention

According to some aspects of the present invention, by an attach procedure led by UE, a PDN connection for performing machine type communication in which a small data packet is transmitted at a low frequency is established, and user data is transmitted using the established PDN connection.

BRIEF DESCRIPTION OF DRAWINGS

FIGS. 2A and 2B are diagrams illustrating an example of a configuration of an IP mobile communication network, and the like.

FIGS. 3A and 3B are diagrams illustrating an example of a configuration of an IP mobile communication network, and the like.

FIG. 7 is a diagram illustrating a storage unit of the MME.

FIG. 8 is a diagram illustrating the storage unit of the MME.

FIG. 9 is a diagram illustrating the storage unit of the MME.

FIG. 10 is a diagram illustrating the storage unit of the MME.

FIG. 11 is a diagram illustrating the storage unit of the MME.

FIGS. 12A to 12D are diagrams illustrating the storage unit of the MME.

FIGS. 15A and 15B are diagrams illustrating the storage unit of the SGW.

FIGS. 18A and 18B are diagrams illustrating the storage unit of the PGW.

FIGS. 21A to 21C are diagrams illustrating a storage unit of the UE.

DESCRIPTION OF EMBODIMENTS

Embodiments of the present invention will be described below.

1. Embodiment 1.1. System Overview

Figure 1:
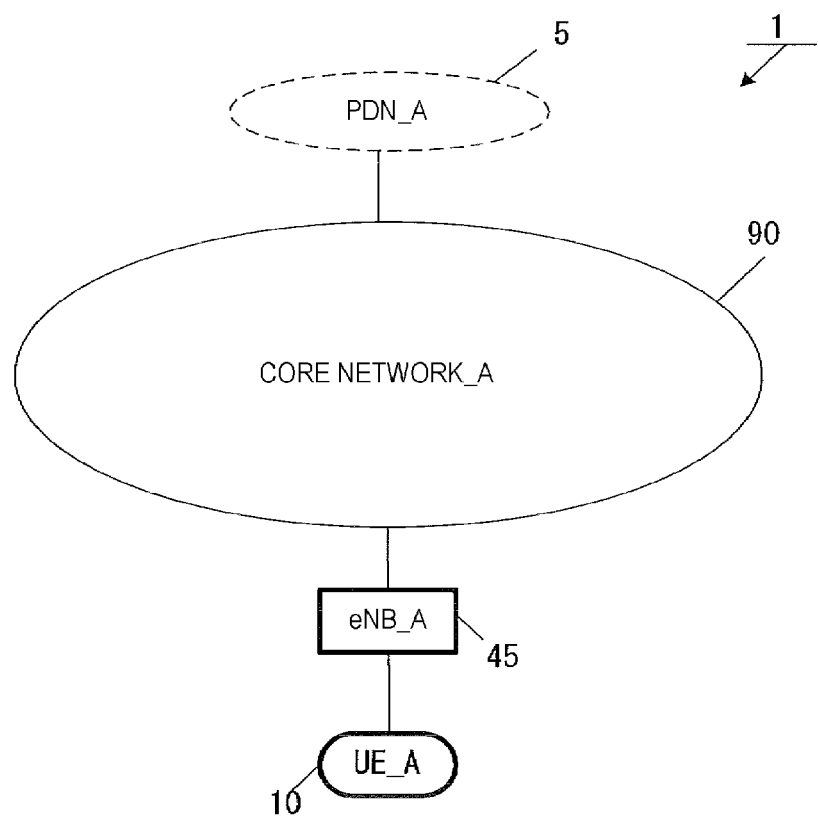
FIG. 1 is a diagram illustrating an overview of a mobile communication system.

FIG. 1 is a diagram illustrating an overview of a mobile communication system according to the present embodiment. As illustrated in FIG. 1, a mobile communication system 1 includes a mobile terminal device UE_A 10, an eNB_A 45, a core network_A 90, and a PDN_A 5.

Here, the UE_A 10 may be any wirelessly connectable terminal device, and may be a User Equipment (UE), a Mobile Equipment (ME), or a Mobile Station (MS).

Additionally, the UE_A 10 may be a CIoT device. Note that the CIoT device is a terminal, which is demanded to have low power consumption, in which data are transmitted and/or received with a low data rate, which has a low function being not required to have a complex capability, and which is allowed to be connected to a 3GPP core network, and is not necessarily connected to the core network using CIoT.

In other words, in a case that the UE_A 10 is the CIoT device, the UE_A 10 may request a connection using CIoT based on a policy of the UE_A 10 or a request from the network, or may request the known connection. Alternatively, the UE_A 10 may be configured as a terminal device which requests only a connection using CIoT beforehand when shipping.

Here, the core network_A 90 refers to an IP mobile communication network run by a Mobile Operator.

For example, the core network_A 90 may be a core network for the mobile operator that runs and manages the mobile communication system 1, or may be a core network for a virtual mobile operator such as a Mobile Virtual Network Operator (MVNO). Alternatively, the core network_A 90 may be a core network for CIoT.

Additionally, the eNB_A 45 is a base station constituting a radio access network used by the UE_A 10 to connect to the core network_A 90. In other words, the UE_A 10 connects to the core network_A 90 using the eNB_A 45.

Additionally, the core network_A 90 is connected to the PDN_A 5. The PDN_A 5 is a packet data service network which provides a communication service to the UE_A 10, and may be configured for each service. A communication terminal is connected to the PDN, the UE_A 10 can transmit and/or receive user data to/from the communication terminal located in the PDN_A 5.

Next, an example of a configuration of the core network_A 90 will be described. In the present embodiment, two configuration examples of the core network_A 90 will be described.

Figure 2A:
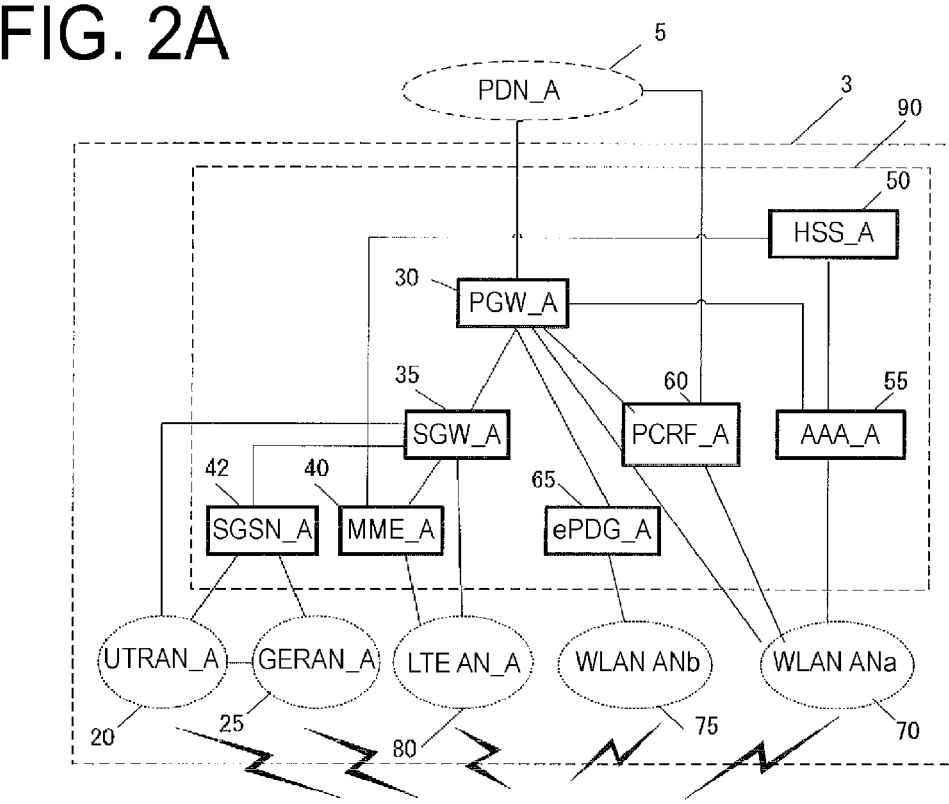
Figure 2B:
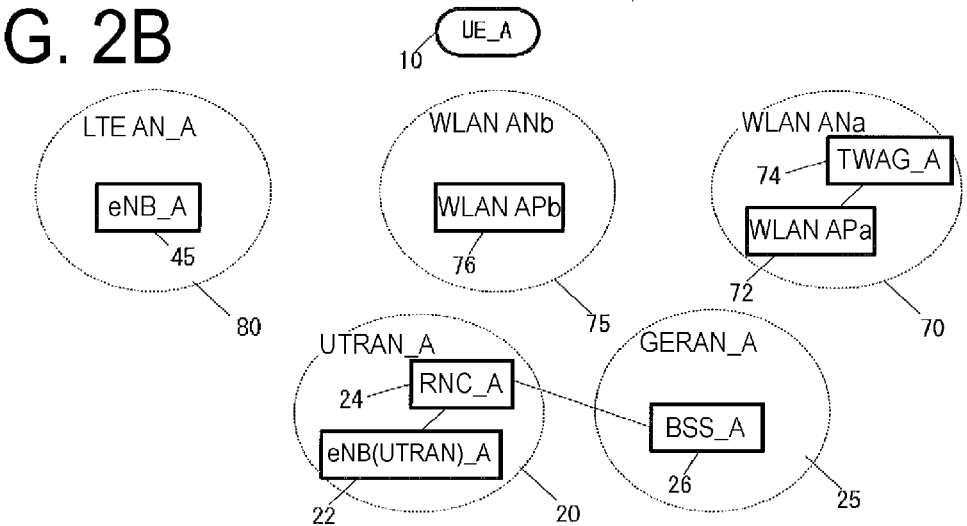

FIGS. 2A and 2B illustrate a first example of the configuration of the core network_90. The core network_A 90 in FIG. 2A includes a Home Subscriber Server (HSS)_A 50, an Authentication, Authorization, Accounting (AAA)_A 55, a Policy and Charging Rules Function (PCRF)_A 60, a Packet Data Network Gateway (PGW)_A 30, an enhanced Packet Data Gateway (ePDG)_A 65, a Serving Gateway (SGW)_A 35, a Mobility Management Entity (MME)_A 40, and a Serving GPRS Support Node (SGSN)_A 42.

Furthermore, the core network_A 90 is capable of connecting to multiple radio access networks (an LTE AN_A 80, a WLAN ANb 75, a WLAN ANa 70, a UTRAN_A 20, and a GERAN_A 25).

Such a radio access network may be configured by connecting to multiple different access networks, or may be configured by connecting to either one of the access networks. Moreover, the UE_A 10 is capable of wirelessly connecting to the radio access network.

Moreover, a WLAN Access Network b (WLAN ANb 75) that connects to the core network via the ePDG_A 65 and a WLAN Access Network a (WLAN ANa 75) that connects to the PGW_A, the PCRF_A 60, and the AAA_A 55 can be configured as access networks connectable in a WLAN access system.

Note that each device has a similar configuration to those of the devices of the related art in a mobile communication system using EPS, and thus detailed descriptions thereof will be omitted. Each device will be described briefly hereinafter.

The PGW_A 30 is connected to the PDN_A 5, the SGW_A 35, the ePDG_A 65, the WLAN Ana 70, the PCRF_A 60, and the AAA_A 55, and serves as a relay device configured to transfer user data by functioning as a gateway device between the PDN_A 5 and the core network_A 90.

The SGW_A 35 is connected to the PGW 30, the MME_A 40, the LTE AN 80, the SGSN_A 42, and the UTRAN_A 20, and serves as a relay device configured to transfer user data by functioning as a gateway device between the core network_A 90 and the 3GPP access network (the UTRAN_A 20, the GERAN_A 25, the LTE AN_A 80).

The MME_A 40 is connected to the SGW_A 35, the LTE AN 80, and the HSS_A 50, and serves as an access control device configured to perform location information management and access control for the UE_A 10 via the LTE AN 80. Furthermore, the core network_A 90 may include multiple location management devices. For example, a location management device different from the MME_A 40 may be configured. As with the MME_A 40, the location management device different from the MME_A 40 may be connected to the SGW_A 35, the LTE AN 80, and the HSS_A 50.

Furthermore, in a case that multiple MMEs are included in the core network_A 90, the MMEs may be connected to each other. With this configuration, the context of the UE_A 10 may be transmitted and/or received between the MMEs.

The HSS_A 50 is connected to the MME_A 40 and the AAA_A 55 and serves as a managing node that manages subscriber information. The subscriber information of the HSS_A 50 is referred to during MME_A 40 access control, for example. Moreover, the HSS_A 50 may be connected to the location management device different from the MME_A 40.

The AAA_A 55 is connected to the PGW 30, the HSS_A 50, the PCRF_A 60, and the WLAN ANa 70, and is configured to perform access control for the UE_A 10 connected via the WLAN ANa 70.

The PCRF_A 60 is connected to the PGW_A 30, the WLAN ANa 75, the AAA_A 55, and the PDN_A 5, and is configured to perform QoS management on data delivery. For example, the PCRF_A 60 manages QoS of a communication path between the UE_A 10 and the PDN_A 5.

The ePDG_A 65 is connected to the PGW 30 and the WLAN ANb 75 and is configured to deliver user data by functioning as a gateway device between the core network_A 90 and the WLAN ANb 75.

The SGSN_A 42 is connected to the UTRAN_A 20, the GERAN_A 25, and the SGW_A 35 and is a control device for location management between a 3G/2G access network (UTRAN/GERAN) and the LTE access network (E-UTRAN). In addition, the SGSN_A 42 has functions of: selecting the PGW and the SGW: managing a time zone of the UE; and selecting the MME at the time of handover to the E-UTRAN.

Additionally, as illustrated in FIG. 2B, each radio access network includes devices to which the UE_A 10 is actually connected (such as a base station device and an access point device), and the like. The devices used in these connections can be thought of as devices adapted to the radio access networks.

In the present embodiment, the LTE AN 80 includes the eNB_A 45. The eNB_A 45 is a radio base station to which the UE_A 10 connects in an LTE access system, and the LTE AN_A 80 may include one or multiple radio base stations.

The WLAN ANa 70 includes a WLAN APa 72 and a TWAG_A 74. The WLAN APa 72 is a radio base station to which the UE_A 10 connects in the WLAN access system trusted by the operator running the core network_A 90, and the WLAN ANa 70 may include one or multiple radio base stations. The TWAG_A 74 serves as a gateway device between the core network_A 90 and the WLAN ANa 70. The WLAN APa 72 and the TWAG_A 74 may be configured as a single device.

Even in a case that the operator running the core network_A 90 and the operator running the WLAN ANa 70 are different, such a configuration can be implemented through contracts and agreements between the operators.

Furthermore, the WLAN ANb 75 includes a WLAN APb 76. The WLAN APb 76 is a radio base station to which the UE_A 10 connects in the WLAN access system in a case that no trusting relationship is established with the operator running the core network_A 90, and the WLAN ANb 75 may include one or multiple radio base stations.

In this manner, the WLAN ANb 75 is connected to the core network_A 90 via the ePDG_A 65, which is a device included in the core network_A 90, serving as a gateway. The ePDG_A 65 has a security function for ensuring security.

The UTRAN_A 20 includes a Radio Network Controller (RNC)_A 24 and an eNB (UTRAN)_A 22. The eNB (UTRAN)_A 22 is a radio base station to which the UE_A 10 connects through a UMTS Terrestrial Radio Access (UTRA), and the UTRAN_A 20 may include one or multiple radio base stations. Furthermore, the RNC_A 24 is a control unit configured to connect the core network_A 90 and the eNB (UTRAN)_A 22, and the UTRAN_A 20 may include one or multiple RNCs. Moreover, the RNC_A 24 may be connected to one or multiple eNBs (UTRANs)_A 22. In addition, the RNC_A 24 may be connected to a radio base station (Base Station Subsystem (BSS)_A 26) included in the GERAN_A 25.

The GERAN_A 25 includes the BSS_A 26. The BSS_A 26 is a radio base station to which the UE_A 10 connects through GSM (trade name)/EDGE Radio Access (GERA), and the GERAN_A 25 may be constituted of one or multiple radio base station BSSs. Furthermore, the multiple BSSs may be connected to each other. Moreover, the BSS_A 26 may be connected to the RNC_A 24.

Figure 3A:
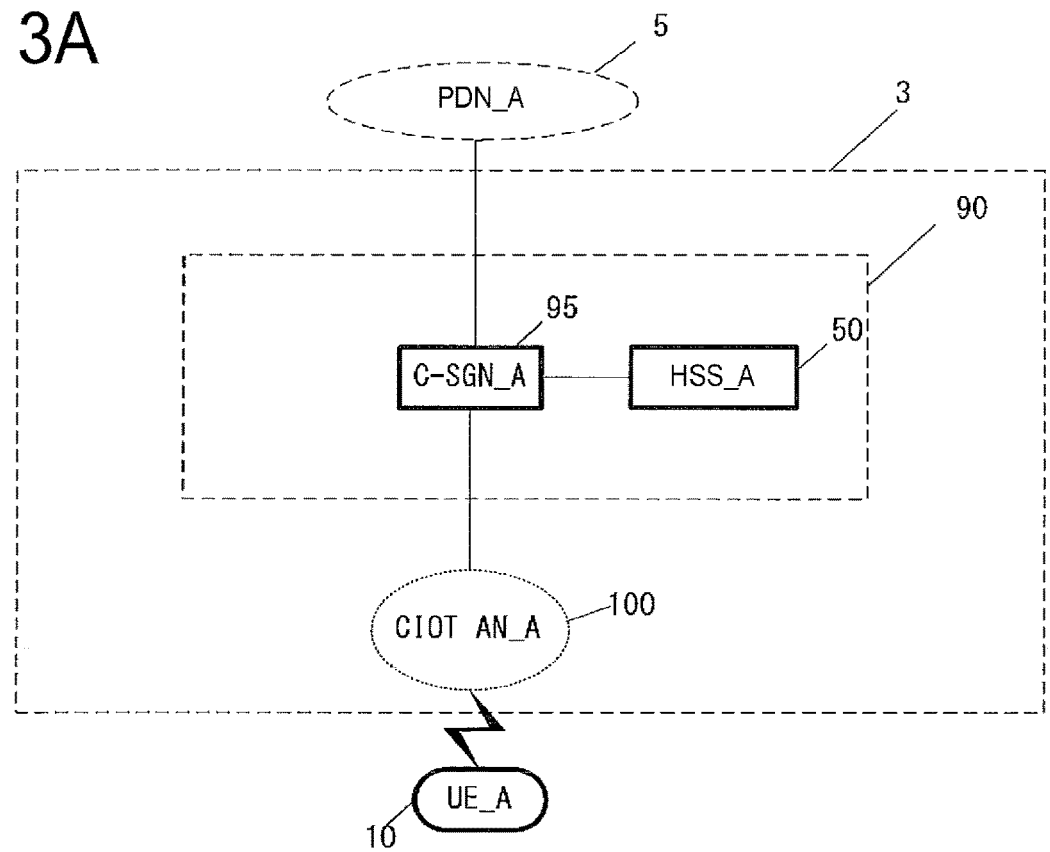
Figure 3B:
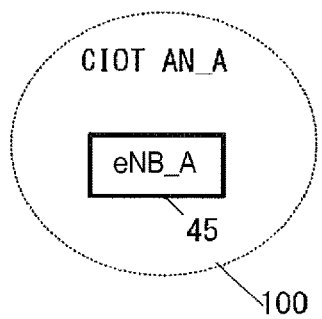

Next, a second example of a configuration of the core network_A 90 will be described. For example, in a case that the UE_A 10 is a CIoT terminal, the core network_A 90 may be configured as illustrated in FIGS. 3A and 3B. The core network_A 90 in FIGS. 3A and 3B includes a CIoT Serving Gateway Node (C-SGN)_A 95 and the HSS_A 50. Note that in the same manner as FIGS. 2A and 2B, in order for the core network_A 90 to provide connectivity to an access network other than LTE, the core network_A 90 may include the AAA_A 55 and/or the PCRF_A 60 and/or the ePDG_A 65 and/or SGSN_A 42.

The C-SGN_A 95 may be a node that has roles of the MME_A 40, the SGW_A 35, and the PGW_A 30 in FIGS. 2A and 2B. The C-SGN_A 95 may be a node for the CIoT terminal.

In other words, the C-SGN_A 95 may have a gateway device function between the PDN_A and the core network_A 90, a gateway device function between the core network_A 90 and a CIOT AN_A 100, and a location management function of the UE_A 10.

As illustrated in the drawings, the UE_A 10 connects to the core network_A 90 through the radio access network CIOT AN_A 100.

FIG. 3B illustrates the configuration of the CIOT AN_A 100. As illustrated in the drawing, the CIOT AN_A 100 may be configured including the eNB_A 45. The eNB_A 45 included in the CIOT AN_A 100 may be the same base station as the eNB_A 45 included in the LTE AN_A 80. Alternatively, the eNB_A 45 included in the CIOT AN_A 100 may be a base station for CIoT, which is different from the eNB_A 45 included in the LTE AN_A 80.

Note that herein, the UE_A 10 being connected to radio access networks refers to the UE_A 10 being connected to a base station device, an access point, or the like included in each of the radio access networks, and data, signals, and the like being transmitted and/or received also pass through those base station devices, access points, or the like.

1.2. Device Configuration

The configuration of each device will be described below.

1.2.1. eNB Configuration

Figure 4:
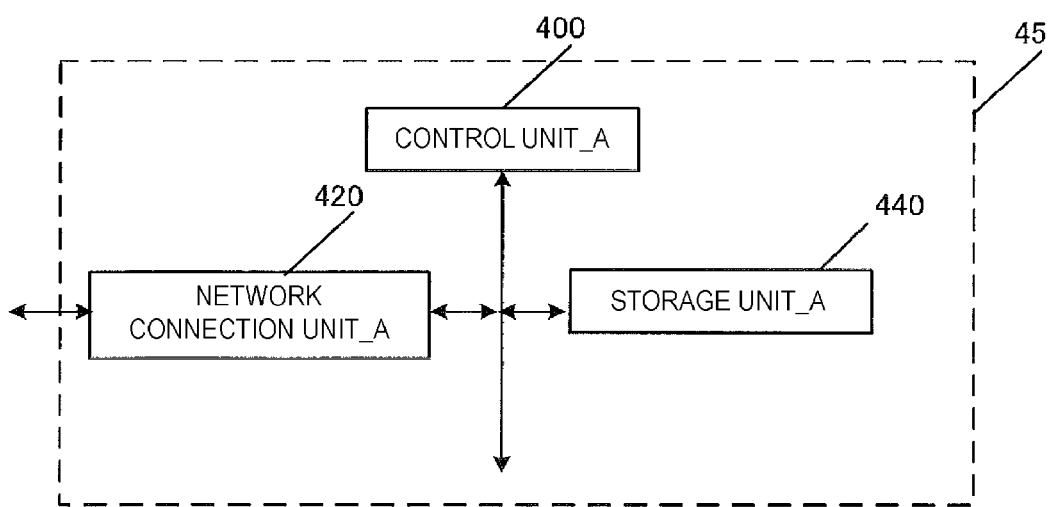
FIG. 4 is a diagram illustrating a device configuration of an eNB.

The configuration of the eNB_A 45 will be described below. FIG. 4 illustrates the device configuration of the eNB_A 45. As illustrated in FIG. 4, the eNB_A 45 includes a network connection unit_A 420, a control unit_A 400, and a storage unit_A 440. The network connection unit_A 420 and the storage unit_A 440 are connected to the control unit_A 400 via a bus.

The control unit_A 400 is a function unit for controlling the eNB_A 45. The control unit_A 400 implements various processes by reading out various programs stored in the storage unit_A 440 and executing the programs.

The network connection unit_A 420 is a function unit through which the eNB_A 45 connects to the MME_A 40 and/or the SGW_A 35 or the C-SGN_A 95.

The storage unit_A 440 is a function unit for storing programs, data, and the like necessary for each operation of the eNB_A 45. A storage unit 640 is constituted of, for example, a semiconductor memory, a Hard Disk Drive (HDD), or the like.

The storage unit_A 440 may store at least identification information and/or control information and/or a flag and/or a parameter included in a control message transmitted and/or received in an attach procedure and a data transmission procedure, which will be described in 1.3 and 1.4.

1.2.2. MME Configuration

Figure 6:
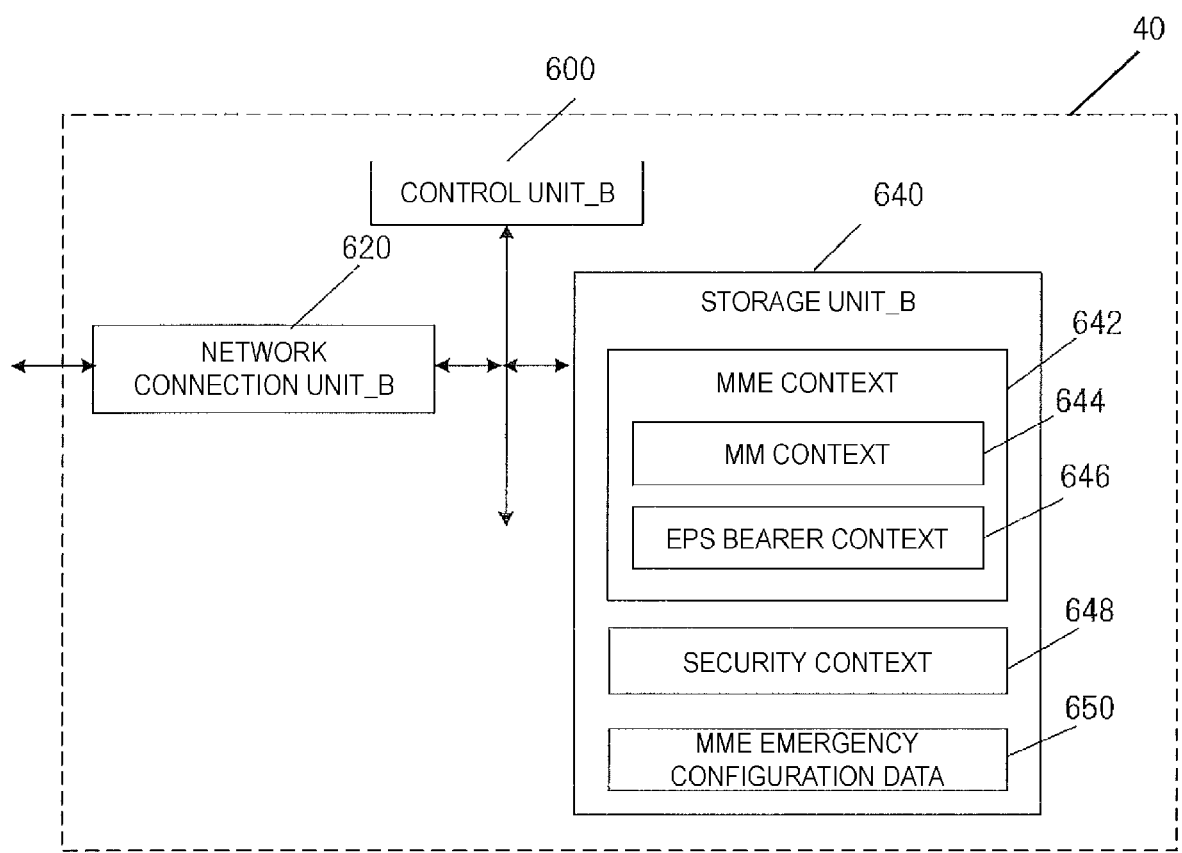
FIG. 6 is a diagram illustrating a device configuration of an MME.

The constitution of the MME_A 40 will be described below. FIG. 6 illustrates the device configuration of the MME_A 40. As illustrated in FIG. 6, the MME_A 40 includes a network connection unit_B 620, a control unit_B 600, and a storage unit_B 640. The network connection unit_B 620 and the storage unit_B 640 are connected to the control unit_B 600 via a bus.

The control unit_B 600 is a function unit for controlling the MME_A 40. The control unit_B 600 implements various processes by reading out and executing various programs stored in the storage unit_B 640.

The network connection unit_B 620 is a function unit through which the MME_A 40 connects to the HSS_A 50 and/or the SGW_A 35.

The storage unit_B 640 is a function unit for storing programs, data, and the like necessary for each operation of the MME_A 40. The storage unit_B 640 is constituted of, for example, a semiconductor memory, a Hard Disk Drive (HDD), or the like.

The storage unit_B 640 may store at least the identification information and/or the control information and/or the flag and/or the parameter included in the control message transmitted and/or received in the attach procedure and the data transmission procedure, which will be described in 1.3 and 1.4.

As illustrated in the drawing, the storage unit_B 640 stores an MME context 642, and a security context 648 and MME Emergency Configuration Data 650. Note that, the MME context 642 is constituted of an MM context 644 and an EPS bearer context 646. Alternatively, the MME context 642 may include an EMM context and an ESM context. The MM context may be the EMM context, the EPS bearer context may be the ESM context.

FIG. 7, FIG. 8, and FIG. 9 illustrate information elements of the MME context stored for each UE. As illustrated in the drawings, the MME context stored for each UE includes an IMSI, an IMSI-unauthenticated-indicator, an MSISDN, an MM State, a GUTI, an ME Identity, a Tracking Area List, a TAI of last TAU, an E-UTRAN Cell Global Identity (ECGI), an E-UTRAN Cell Identity Age, a CSG ID, a CSG membership, an Access mode, an Authentication Vector, a UE Radio Access Capability, an MS Classmark 2, an MS Classmark 3, Supported Codecs, a UE Network Capability, an MS Network Capability, UE Specific DRX Parameters, a Selected NAS Algorithm, an eKSI, a K_ASME, NAS Keys and COUNT, a Selected CN operator ID, a Recovery, an Access Restriction, an ODB for PS parameters, an APN-OI Replacement, an MME IP address for S11, an MME TEID for S11, an S-GW IP address for S11/S4, an S GW TEID for S11/S4, an SGSN IP address for S3, an SGSN TEID for S3, an eNodeB Address in Use for S1-MME, an eNB UE S1 AP ID, an MME UE S1 AP ID, a Subscribed UE-AMBR, a UE-AMBR, EPS Subscribed Charging Characteristics, a Subscribed RFSP Index, an RFSP Index in Use, a Trace reference, a Trace type, a Trigger ID, an OMC identity, a URRP-MME, CSG Subscription Data, a LIPA Allowed, a Subscribed Periodic RAUTAU Timer, an MPS CS priority, an MPS EPS priority, a Voice Support Match Indicator, and a Homogenous Support of IMS Voice over PS Sessions.

The IMSI is permanent identification information of a user. The IMSI is identical to the IMSI stored in the HSS_A 50.

The IMSI-unauthenticated-indicator is instruction information indicating that this IMSI is not authenticated.

The MSISDN represents the phone number of the UE. The MSISDN is indicated by a storage unit of the HSS_A 50.

The MM State indicates a mobility management state of the MME. This management information indicates an ECM-IDLE state in which a connection between the eNB and the core network is released, an ECM-CONNECTED state in which the connection between the eNB and the core network is not released, or an EMM-DEREGISTERED state in which the MME does not store the location information of the UE.

The Globally Unique Temporary Identity (GUTI) is temporary identification information about the UE. The GUTI includes the identification information about the MME (Globally Unique MME Identifier (GUMMEI)) and the identification information about the UE in a specific MME (M-TMSI).

The ME identity is an ID of the UE, and may be the IMEI/IMISV, for example.

The Tracking Area List is a list of tracking area identification information which is assigned to the UE.

The TAI of last TAU is the tracking area identification information indicated by a recent tracking area update procedure. The ECGI is cell identification information of the recent UE known by the MME_A 40.

The E-UTRAN Cell Identity Age indicates the elapsed time since the MME acquires the ECGI.

The CSG ID is identification information of a Closed Subscriber Group (CSG), in which the UE recently operates, known by the MME. The CSG membership is member information of the CSG of the recent UE known by the MME. The CSG membership indicates whether the UE is the CSG member.

The Access mode is an access mode of a cell identified by the ECGI, may be identification information indicating that the ECGI is a hybrid which allows to access both the UEs which is the CSG and is not the CSG.

The Authentication Vector indicates a temporary Authentication and Key Agreement (AKA) of a specific UE followed by the MME. The Authentication Vector includes a random value RAND used for authentication, an expectation response XRES, a key K_ASME, and a language (token) AUTN authenticated by the network.

The UE Radio Access Capability is identification information indicating a radio access capability of the UE.

MS Classmark 2 is a classification symbol (Classmark) of a core network of a CS domain of 3G/2G (UTRAN/GERAN). The MS Classmark 2 is used in a case that the UE supports a Single Radio Voice Call Continuity (SRVCC) for the GERAN or the UTRAN.

MS Classmark 3 is a classification symbol (Classmark) of a radio network of the CS domain of the GERAN. The MS Classmark 3 is used in a case that the UE supports the Single Radio Voice Call Continuity (SRVCC) for the GERAN.

The Supported Codecs are a code list supported by the CS domain. This list is used in a case that the UE supports SRVCC for the GERAN or the UTRAN.

The UE Network Capability includes an algorithm of security supported by the UE and a key derivation function.

The MS Network Capability is information including at least one kind of information necessary for the SGSN to the UE having the GERAN and/or UTRAN function.

The UE Specific DRX Parameters are parameters used for determining a Discontinuous Reception (DRX) cycle length of the UE. Here, DRX is a function for changing the UE to a low-power-consumption mode in a case that there is no communication in a certain period of time, in order to reduce power consumption of a battery of the UE as much as possible.

The Selected NAS Algorithm is a selected security algorithm of a Non-Access Stream (NAS).

The eKSI is a key set indicating the K_ASME. The eKSI may indicate whether a security key acquired by a security authentication of the UTRAN or the E-UTRAN is used.

The K_ASME is a key for E-UTRAN key hierarchy generated based on a Cipher Key (CK) and an Integrity Key (K).

The NAS Keys and COUNT includes a key K_NASint, a key K_NASenc, and a NAS COUNT parameter. The key K_NASint is a key for encryption between the UE and the MME, the key K_NASenc is a key for security protection between the UE and the MME. Additionally, NAS COUNT is a count which starts a count in a case that a new key by which security between the UE and the MME is established is configured.

The Selected CN operator ID is identification information, which is used for sharing the network among operators, of a selected core network operator.

The Recovery is identification information indicating whether the HSS performs database recovery. The Access Restriction is registration information for access restriction.

The ODB for PS parameters indicates a state of an Operator Determined Barring (ODB). Here, ODB is an access rule determined by the network operator (operator).

The APN-OI Replacement is a domain name substituting for APN when PGW FQDN is constructed in order to execute a DNS resolution. This substitute domain name is applied to all APNs.

The MME IP address for S11 is an IP address of the MME used for an interface with the SGW.

The MME TEID for S11 is a Tunnel Endpoint IDentifier (TEID) used for the interface with the SGW.

The S-GW IP address for S11/S4 is an IP address of the SGW used for an interface between the MME and the SGW or between the SGSN and the MME.

The S GW TEID for S11/S4 is a TEID of the SGW used for the interface between the MME and the SGW or between the SGSN and the MME.

The SGSN IP address for S3 is an IP address of the SGSN used for the interface between the MME and the SGSN.

The SGSN TEID for S3 is a TEID of the SGSN used for the interface between the MME and the SGSN.

The eNodeB Address in Use for S1-MME is an IP address of the eNB recently used for an interface between the MME and the eNB.

The eNB UE S1AP ID is identification information of the UE in the eNB. The MME UE S1AP ID is identification information of the UE in the MME.

The Subscribed UE-AMBR indicates the maximum value of a Maximum Bit Rate (MBR) of uplink communication and downlink communication for sharing all Non-Guaranteed Bit Rate (GBR) bearers (non-guaranteed bearers) in accordance with user registration information.

The UE-AMBR indicates the maximum value of the MBR of the uplink communication and the downlink communication which are recently used for sharing all the Non-GBR bearers (non-guaranteed bearers).

The EPS Subscribed Charging Characteristics indicate a charging performance of the UE. For example, the EPS Subscribed Charging Characteristics may indicate registration information such as normal, prepaid, a flat rate, hot billing, or the like.

The Subscribed RFSP Index is an index for a specific RRM configuration in the E-UTRAN acquired from the HSS.

The RFSP Index in Use is an index for the specific RRM configuration in the E-UTRAN which is recently used.

The Trace reference is identification information for identifying a specific trace record or a record set. The Trace type indicates a type of the trace. For example, the Trace type may indicate a type traced by the HSS and/or a type traced by the MME, the SGW, or the PGW. The Trigger ID is identification information for identifying a constituent element for which the trace starts.

The OMC Identity is identification information for identifying OMC which receives the record of the trace. The URRP-MME is identification information indicating that the HSS requests UE activity notification from the MME.

The CSG Subscription Data are a relevant list of a PLMN (VPLMN) CSG ID of a roaming destination and an equivalent PLMN of the roaming destination. The CSG Subscription Data may be associated with an expiration date indicating an expiration date of the CSG ID and an absent expiration date indicating that there is no expiration date for each CSG ID. The CSG ID may be used for a specific PDN connection through LIPA.

The LIPA Allowed indicates whether the UE is allowed to use LIPA in this PLMN.

The Subscribed Periodic RAU/TAU Timer is a timer of a periodic RAU and/or TAU.

The MPS CS priority indicates that the UE is registered in eMLPP or a 1xRTT priority service in the CS domain.

The MPS EPS priority is identification information indicating that the UE is registered in MPS in the EPS domain.

The Voice Support Match Indicator indicates whether a radio capability of the UE is compatible with the network configuration. For example, the Voice Support Match Indicator indicates whether the SRVCC support by the UE matches the support for voice call by the network.

The Homogenous Support of IMS Voice over PS Sessions for MME is instruction information indicating, for each UE, whether an IMS voice call on a PS session is supported. The Homogenous Support of IMS Voice over PS Sessions for MME includes "Supported" in which an IP Multimedia Subsystem (IMS) voice call on a Packet Switched (PS: line switching) session in all the Tracking Areas (TAs) managed by the MME is supported, and "Not Supported" indicating a case where there is no TA in which the IMS voice call on the PS session is supported. Additionally, the MME does not notify the HSS of this instruction information, in a case that the IMS voice call on the PS session is not uniformly supported (the TA in which the support is performed and the TA in which the support is not performed are both present in the MME), and in a case that it is not clear whether to be supported.

FIG. 10 illustrates information elements included in the MME context stored for each PDN connection. As illustrated in the drawing, the MME context stored for each PDN connection includes an APN in Use, an APN Restriction, an APN Subscribed, a PDN Type, an IP Address, EPS PDN Charging Characteristics, an APN-OI Replacement, SIPTO permissions, a Local Home Network ID, LIPA permissions, a WLAN offloadability, a VPLMN Address Allowed, a PDN GW Address in Use (control information), a PDN GW TEID for S5/S8 (control information), an MS Info Change Reporting Action, a CSG Information Reporting Action, a Presence Reporting Area Action, an EPS subscribed QoS profile, a Subscribed APN-AMBR, an APN-AMBR, a PDN GW GRE Key for uplink traffic (user data), a Default bearer, and a low access priority.

The APN in Use indicates APN that has been recently used. This APN includes identification information about the APN network and identification information about a default operator.

The APN Restriction indicates a restriction on a combination of an APN type to APN associated with this bearer context. In other words, the APN Restriction is information for restricting the number of APNs and APN which can be established in this PDN connection.

The APN Subscribed refers to a registration APN received from the HSS.

The PDN Type indicates the type of the IP address. The PDN Type indicates IPv4, IPv6, or IPv4v6, for example.

The IP Address indicates an IPv4 address or an IPv6 Prefix. Note that the IP address may store both the IPv4 and IPv6 prefixes.

The EPS PDN Charging Characteristics indicate a charging performance of the PDN connection. The EPS PDN Charging Characteristics may indicate, for example, normal, prepaid, a flat rate, or hot billing.

The APN-OI Replacement is a proxy domain name of APN having the same role as that of the APN-OI Replacement, registered for each UE. Note that the APN-OI Replacement has a higher priority than that of the APN-OI Replacement for each UE.

The SIPTO permissions indicate permission information to a Selected IP Traffic Offload (SIPTO) of traffic using this APN. Specifically, the SIPTO permissions identify a prohibition of the use of SIPTO, permission of the use of SIPTO in the network excluding the local network, permission of the use of SIPTO in the network including the local network, or permission of the use of SIPTO only in the local network.

The Local Home Network ID indicates identification information of a home network to which the base station belongs, in a case that SIPTO (SIPTO@LN) using the local network can be used in this PDN connection. The LIPA permissions are identification information indicating whether this PDN can access through LIPA. Specifically, the LIPA permissions may be an LIPA-prohibited which does not permit LIPA, an LIPA-only which permits only LIPA, or an LIPA-conditional which permits LIPA depending on a condition.

The WLAN offload ability is identification information indicating whether traffic connected through this APN can perform offload to the wireless LAN by utilizing a cooperative function between the wireless LAN and 3GPP, or maintains the 3GPP connection. The WLAN offload ability may vary for each RAT type. Specifically, different WLAN offload abilities may be present for LTE (E-UTRA) and 3G (UTRA).

The VPLMN Address Allowed indicates whether a connection in which the UE uses this APN is allowed to use only an HPLMN domain (IP address) PGW in PLMN (VPLMN) of the roaming destination or allowed to use additionally the PGW in the VPLMN domain.

The PDN GW Address in Use (control information) indicates a recent IP address of the PGW. This address is used when a control signal is transmitted. The PDN GW TEID for S5/S8 (control information) is a TEID used for transmission and/or reception of the control information in an interface (S5/S8) between the SGW and the PGW.

The MS Info Change Reporting Action is an information element indicating that it is necessary to notify the PGW of user location information being changed. The CSG Information Reporting Action is an information element indicating that it is necessary to notify the PGW of CSG information being changed.

The Presence Reporting Area Action indicates necessity of notification of a change as to whether or not the UE is present in a presence reporting area. This information element separates into identification information of the presence reporting area and an element included in the presence reporting area.

The EPS subscribed QoS profile indicates a QoS parameter to a default bearer at a bearer level.

The Subscribed APN-AMBR indicates the maximum value of the Maximum Bit Rate (MBR) of the uplink communication and the downlink communication for sharing all the Non-GBR bearers (non-guaranteed bearers) established for this APN in accordance with the user registration information.

The APN-AMBR indicates the maximum value of the Maximum Bit Rate (MBR) of the uplink communication and the downlink communication for sharing all the Non-GBR bearers (non-guaranteed bearers) established for this APN, which has been determined by the PGW.

The PDN GW GRE Key for uplink traffic (user data) is a Generic Routing Encapsulation (GRE) key for the uplink communication of the user data of the interface between the SGW and the PGW.

The Default bearer is EPS bearer identification information for identifying a default bearer in this PDN connection. The low access priority indicates that the UE requests a low access priority, when the PDN connection is opened.

FIG. 11 illustrates the MME context stored for each bearer. As illustrated in the drawing, the MME context stored for each bearer includes an EPS Bearer ID, a TI, an S-GW IP address for S1-u, an S-GW TEID for S1u, a PDN GW TEID for S5/S8, a PDN GW IP address for S5/S8, an EPS bearer QoS, and a TFT.

The EPS Bearer ID is the only identification information for identifying the EPS bearer for a UE connection via the E-UTRAN.

The TI is an abbreviation of a "Transaction Identifier", and is identification information identifying a bidirectional message flow (Transaction).

The S-GW IP address for S1-u is an IP address of the SGW used for an interface between the eNB and the SGW.

The S-GW TEID for S1u is a TEID of the SGW used for the interface between the eNB and the SGW.

The PDN GW TEID for S5/S8 is a TEID of the PGW for user data transmission in the interface between the SGW and the PGW.

The PDN GW IP address for S5/S8 is an IP address of the PGW for user data transmission in the interface between the SGW and the PGW.

The EPS bearer QoS includes a QoS Class Identifier (QCI) and an Allocation and Retention Priority (ARP). QCI indicates a class to which the QoS belongs. QoS can be classified in accordance with presence or absence of band control, an allowable delay time, a packet loss rate, or the like. QCI includes information indicating a priority. ARP is information representing a priority relating to maintaining the bearer.

The TFT is an abbreviation of a "Traffic Flow Template", and indicates all packet filters associated with the EPS bearer.

Here, the information elements included in the MME context illustrated in FIG. 7 to FIG. 11 are included in either the MM context 644 or the EPS bearer context 646. For example, the MME context for each bearer illustrated in FIG. 11 may be stored in the EPS bearer context, and the other information elements may be stored in the MM context. Alternatively, the MME context for each PDN connection illustrated in FIG. 10 and the MME context for each bearer illustrated in FIG. 11 may be in the EPS bearer context, and the other information elements may be in the MM context.

As illustrated in FIG. 6, the storage unit_B 640 of the MME may store the security context 648. FIG. 12A illustrates information elements included in the security context 648.

As illustrated in the drawing, the security context includes an EPS AS security context and an EPS NAS security context. The EPS AS security context is a context relating to security of an access stratum (Access Stream (AS)), the EPS NAS security context is a context relating to security of a non-access stratum (Non-Access Stream (NAS)).

FIG. 12B illustrates information elements included in the EPS AS security context. As illustrated in the drawing, the EPS AS security context includes a cryptographic key, a Next Hop parameter (NH), a Next Hop Chaining Counter parameter (NCC), and identifiers of the selected AS level cryptographic algorithms. The cryptographic key is an encryption key in an access stratum.

The NH is an information element determined from the K_ASME. The NH is an information element for enabling a forward security.

The NCC is an information element associated with the NH. The NCC represents the number of occurrences of handovers in a vertical direction changing the network.

The identifiers of the selected AS level cryptographic algorithms are identification information of a selected encryption algorithm.

FIG. 12C illustrates information elements included in the EPS NAS security context. As illustrated in the drawing, the EPS NAS security context may include the K_ASME, a UE Security capabilitie, and the NAS COUNT.

The K_ASME is a key for E-UTRAN key hierarchy generated based on the keys CK and IK.

The UE Security capabilitie is a set of identification information corresponding to a cipher and an algorithm used by the UE. This information includes information for the access stratum and information for the non-access stratum. Furthermore, in a case that the UE supports access to the UTRAN/GERAN, this information includes information for the UTRAN/GERAN. The NAS COUN is a counter indicating the time during which the K_ASME is operating.

The security context 648 may be included in the MME context 642. Additionally, as illustrated in FIG. 6, the security context 648 and the MME context 642 may be separately present.

FIG. 12D illustrates information elements stored in the MME Emergency Configuration Data 650. The MME Emergency Configuration Data are information which is used instead of registration information of the UE acquired from the HSS. As illustrated in the drawing, the MME Emergency Configuration Data 650 include an Emergency Access Point Name (em APN), an Emergency QoS profile, an Emergency APN-AMBR, an Emergency PDN GW identity, and a Non-3GPP HO Emergency PDN GW identity.

The em APN indicates an access point name used for the PDN connection for emergency. The Emergency QoS profile indicates QoS of the default bearer of em APN at a bearer level.

The Emergency APN-AMBR indicates the maximum value of the MBR of the uplink communication and the downlink communication for sharing the Non-GBR bearers (non-guaranteed bearers) established for em APN. This value is determined by the PGW.

The Emergency PDN GW identity is identification information of the PGW statically configured to em APN. This identification information may be an FQDN or an IP address.

The Non-3GPP HO Emergency PDN GW identity is identification information of the PGW statically configured to em APN, in a case that the PLMN supports a handover to an access network other than 3GPP. This identification information may be an FQDN or an IP address. Furthermore, the MME_A 40 may manage a connection state with respect to the UE while synchronizing with the UE.

1.2.3. SGW Configuration

Figures 13, 14:
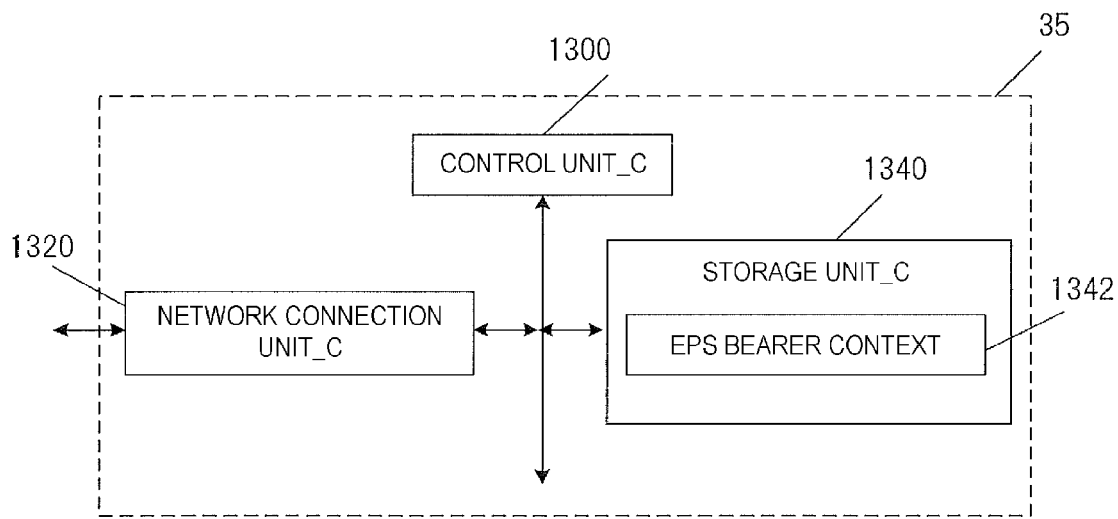
FIG. 13 is a diagram illustrating a device configuration of a SGW.
FIG. 14 is a diagram illustrating a storage unit of the SGW.

Hereinafter, the configuration of the SGW_A 35 will be described. FIG. 13 illustrates the device configuration of the SGW_A 35. As illustrated in FIG. 13, the SGW_A 35 includes a network connection unit_C 1320, a control unit_C 1300, and a storage unit_C 1340. The network connection unit_C 1320 and the storage unit_C 1340 are connected to the control unit_C 1300 via a bus.

The control unit_C 1300 is a function unit for controlling the SGW_A 35. The control unit_C 1300 implements various processes by reading out and executing various programs stored in the storage unit_C 1340.

The network connection unit_C 1320 is a function unit through which the SGW_A 35 connects to the MME_A 40 and/or the PGW_A 30 and/or SGSN_A 42.

The storage unit_C 1340 is a function unit for storing programs, data, and the like necessary for each operation of the SGW_A 35. The storage unit_C 1340 is constituted of, for example, a semiconductor memory, a Hard Disk Drive (HDD), or the like.

The storage unit_C 1340 may store at least the identification information and/or the control information and/or the flag and/or the parameter included in the control message transmitted and/or received in the attach procedure and the data transmission procedure, which will be described in 1.3 and 1.4.

As illustrated in FIG. 13, the storage unit_C 1340 stores an EPS bearer context 1342. Note that the EPS bearer context includes an EPS bearer context stored for each UE, an EPS bearer context stored for each PDN, and an EPS bearer context stored for each bearer.

FIG. 14 illustrates information elements of the EPS bearer context stored for each UE. As illustrated in FIG. 14, the EPS bearer context stored for each UE includes an IMSI, an MSI-unauthenticated-indicator, an ME Identity, an MSISDN, a Selected CN operator id, an MME TEID for S11, an MME IP address for S11, an S-GW TEID for S11/S4, an S-GW IP address for S11/S4, an SGSN IP address for S4, an SGSN TEID for S4, a Trace reference, a Trace type, a Trigger ID, an OMC identity, a Last known Cell Id, and a Last known Cell Id age.

The IMSI is permanent identification information of a user. The IMSI is identical to the IMSI in the HSS_A 50. The IMSI-unauthenticated-indicator is instruction information indicating that this IMSI is not authenticated.

The ME Identity is identification information of the UE, and may be the IMEI/IMISV, for example. The MSISDN represents a basic phone number of the UE. The MSISDN is indicated by the storage unit of the HSS_A 50.

The Selected CN operator id is identification information, which is used for sharing the network among operators, of a selected core network operator.

The MME TEID for S11 is a TEID of the MME used for the interface between the MME and the SGW.

The MME IP address for S11 is an IP address of the MME used for the interface between the MME and the SGW.

The S-GW TEID for S11/S4 is a TEID of the SGW used for the interface between the MME and the SGW, or the interface between the SGSN and the SGW.

The S-GW IP address for S11/S4 is an IP address of the SGW used for the interface between the MME and the SGW, or the interface between the SGSN and the SGW The SGSN IP address for S4 is an IP address of the SGSN used for the interface between the SGSN and the SGW.

The SGSN TEID for S4 is a TEID of the SGSN used for the interface between the SGSN and the SGW.

The Trace reference is identification information for identifying a specific trace record or a record set.

The Trace Type indicates a type of the trace. For example, the Trace type may indicate a type traced by the HSS and/or a type traced by the MME, the SGW, or the PGW. The Trigger ID is identification information for identifying a constituent element for which the trace starts. The OMC Identity is identification information for identifying the OMC which receives the record of the trace. The Last known Cell ID is recent location information of the UE notified by the network. The Last known Cell ID age is information indicating the period from the time when the Last known Cell ID is stored to the present.

Furthermore, the EPS bearer context includes an EPS bearer context stored for each PDN connection. FIG. 15A illustrates the EPS bearer context stored for each PDN connection. As illustrated in the drawing, the EPS bearer context for each PDN connection includes an APN in Use, EPS PDN Charging Characteristics, a P-GW Address in Use (control information), a P-GW TEID for S5/S8 (control information), a P-GW Address in Use (user data), a P-GW GRE Key for uplink (user data), an S-GW IP address for S5/S8 (control information), an S-GW TEID for S5/S8 (control information), an S GW Address in Use (user data), a S-GW GRE Key for downlink traffic (user data), and a Default Bearer.

The APN in Use indicates APN that has recently been used. This APN includes identification information about the APN network and identification information about a default operator. Additionally, this information is information acquired from the MME or the SGSN.

The EPS PDN Charging Characteristics indicate a charging performance of the PDN connection. The EPS PDN Charging Characteristics may indicate, for example, normal, prepaid, a flat rate, or hot billing.

The P-GW Address in Use (control information) is an IP address of the PGW used when the SGW recently transmits the control information. The P-GW TEID for S5/S8 (control information) is a TEID of the PGW used for transmission of the control information in the interface between the SGW and the PGW. The P-GW Address in Use (user data) is an IP address of the PGW used when the SGW recently transmits the user data. The P-GW GRE Key for uplink (user data) is the GRE key for the uplink communication of the user data of the interface between the SGW and the PGW.

The S-GW IP address for S5/S8 (control information) is an IP address of the SGW used for the interface of the control information between the SGW and the PGW. The S-GW TEID for S5/S8 (control information) is a TEID of the SGW used for the interface of the control information between the GW and the PGW. The S GW Address in Use (user data) is an IP address of the SGW which is recently used when the SGW transmits the user data. The S-GW GRE Key for downlink traffic (user data) is the GRE key of the uplink communication used for the interface of the user data between the SGW and the PGW.

The Default Bearer is identification information for identifying a default bearer in this PDN connection.

Furthermore, the EPS bearer context of the SGW includes the EPS bearer context for each bearer. FIG. 15D illustrates the EPS bearer context for each bearer. As illustrated in the drawing, the EPS bearer context for each bearer includes an EPS Bearer Id, a TFT, a P-GW Address in Use (user data), a P-GW TEID for S5/S8 (user data), an S-GW IP address for S5/S8 (user data), an S-GW TEID for S5/S8 (user data), an S-GW IP address for S1-u, S12 and S4 (user data), an S-GW TEID for S1-u, S12 and S4 (user data), an eNodeB IP address for S1-u, an eNodeB TEID for S1-u, an RNC IP address for S12, an RNC TEID for S12, an SGSN IP address for S4 (user data), an SGSN TEID for S4 (user data), an EPS Bearer QoS, and a Charging Id.

The EPS Bearer Id is the only identification information identifying the EPS bearer for the UE connection via the E-UTRAN. That is, the EPS Bearer Id is identification information for identifying the bearer.

The TFT indicates all the packet filters associated with the EPS bearer.

The P-GW Address in Use (user data) is an IP address of the PGW which is recently used for transmission of the user data in the interface between the SGW and the PGW.

The P-GW TEID for S5/S8 (user data) is a TEID of the PGW for the interface of the user data between the SGW and the PGW.

The S-GW IP address for S5/S8 (user data) is an IP address of the SGW for the user data received from the PGW.

The S-GW TEID for S5/S8 (user data) is a TEID of the SGW for the interface of the user data between the SGW and the PGW.

The S-GW IP address for S1-u, S12 and S4 (user data) is an IP address of the SGW used for the interface between the SGW and the 3GPP access network (the LTE access network or GERAN/UTRAN).

The S-GW TEID for S1-u, S12 and S4 (user data) is a TEID of the SGW used for the interface between the SGW and the 3GPP access network (the LTE access network or GERAN/UTRAN).

The eNodeB IP address for S-u is an IP address of the eNB used for transmission between the SGW and the eNB. The eNodeB TEID for S-u is a TEID of the eNB used for the transmission between the SGW and the eNB.

The RNC IP address for S12 is an IP address of the RNC used for the interface between the SGW and the UTRAN. The RNC TEID for S12 is a TEID of the RNC used for the interface between the SGW and the UTRAN.

The SGSN IP address for S4 (user data) is an IP address of the SGSN used for transmission of the user data between the SGW and the SGSN. The SGSN TEID for S4 (user data) is a TEID of the SGSN used for the transmission of the user data between the SGW and the SGSN.

The EPS Bearer QoS represents the QoS of this bearer, and may include an ARP, a GBR, an MBR, and a QCI. Here, the ARP is information representing the priority relating to maintaining the bearer. Additionally, the Guaranteed Bit Rate (GBR) represents a band guaranteed bit rate, and the Maximum Bit Rate (MBR) represents the maximum bit rate. The QCI can be classified in accordance with presence or absence of band control, an allowable delay time, a packet loss rate, or the like. The QCI includes information indicating the priority.

The Charging Id is identification information for recording charging generated in the SGW and the PGW.

1.2.4. PGW Configuration

Figures 16, 17A, 17B:
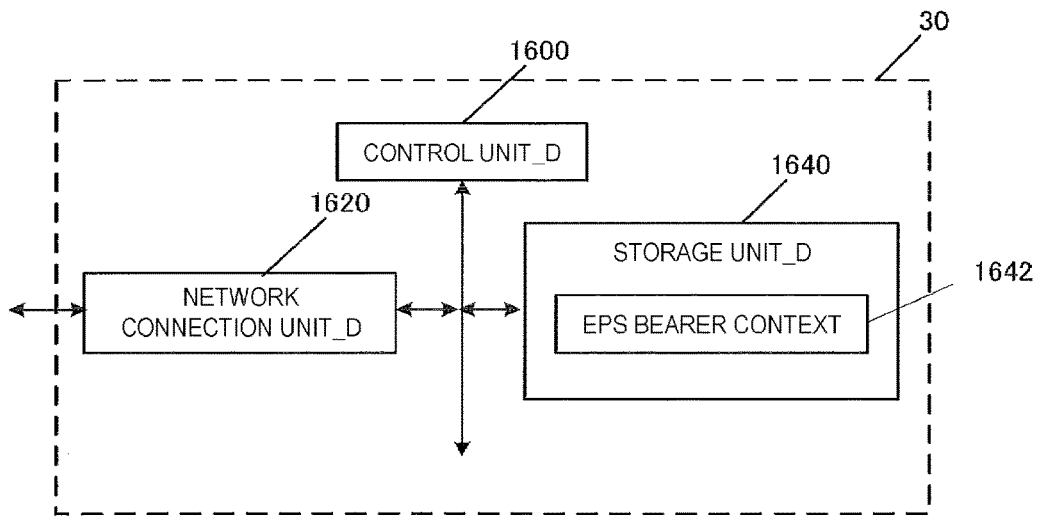
FIG. 16 is a diagram illustrating a device configuration of a PGW.
FIGS. 17A and 17B are diagrams illustrating a storage unit of the PGW.

Hereinafter, the configuration of the PGW_A 30 will be described. FIG. 16 illustrates the device configuration of the PGW_A 30. As illustrated in FIG. 16, the PGW_A 30 includes a network connection unit_D 1620, a control unit_D 1600, and a storage unit_D 1640. The network connection unit_D 1620 and the storage unit_D 1640 are connected to the control unit_D 1600 via a bus.

The control unit_D 1600 is a function unit for controlling the PGW_A 30. The control unit_D 1600 implements various processes by reading out and executing various programs stored in the storage unit_D 1640.

The network connection unit_D 1620 is a function unit through which the PGW_A 30 is connected to the SGW_A 35 and/or the PCRF_A 60 and/or the ePDG_A 65 and/or the AAA_A 55 and/or the GW_A 74.

The storage unit_D 1640 is a function unit for storing programs, data, and the like necessary for each operation of the PGW_A 30. The storage unit_D 1640 is constituted of, for example, a semiconductor memory, a Hard Disk Drive (HDD), or the like.

The storage unit_D 1640 may store at least the identification information and/or the control information and/or the flag and/or the parameter included in the control message transmitted and/or received in the attach procedure and the data transmission procedure, which will be described in 1.3 and 1.4.

As illustrated in FIG. 16, the storage unit_D 1640 stores an EPS bearer context 1642. Note that the EPS bearer context includes an EPS bearer context stored for each UE, an EPS bearer context stored for each APN, an EPS bearer context stored for each PDN connection, and an EPS bearer context stored for each bearer.

FIG. 17A illustrates information elements included in the EPS bearer context stored for each UE. As illustrated in FIG. 17A, the EPS bearer context stored for each UE includes an IMSI, an IMSI-unauthenticated-indicator, an ME Identity, an MSISDN, a Selected CN operator id, an RAT type, a Trace reference, a Trace type, a Trigger id, and an OMC identity.

The IMSI is identification information to be assigned to a user using the UE. The IMSI-unauthenticated-indicator is instruction information indicating that this IMSI is not authenticated. The ME Identity is an ID of the UE, and may be the IMEI/IMISV, for example. The MSISDN represents a basic phone number of the UE. The MSISDN is indicated by the storage unit of the HSS_A 50. The Selected CN operator ID is identification information, which is used for sharing the network among operators, of a selected core network operator.

The RAT type indicates a recent Radio Access Technology (RAT) of the UE. The RAT type may be, for example, the E-UTRA (LTE), the UTRA, or the like. The Trace reference is identification information for identifying a specific trace record or a record set. The Trace type indicates a type of the trace. For example, the Trace type may indicate a type traced by the HSS and/or a type traced by the MME, the SGW, or the PGW. The Trigger ID is identification information for identifying a constituent element for which the trace starts. The OMC Identity is identification information for identifying the OMC which receives the record of the trace.

Next, FIG. 17B illustrates the EPS bearer context stored for each APN. As illustrated in the drawing, the EPS bearer context stored for each APN of the PGW storage unit includes an APN in use and an APN-AMBR.

The APN in Use indicates APN which is recently used. This APN includes identification information about the APN network and identification information about a default operator. This information is acquired from the SGW.

The APN-AMBR indicates the maximum value of the Maximum Bit Rate (MBR) of the uplink communication and the downlink communication for sharing all the Non-GBR bearers (non-guaranteed bearers) established for this APN.

Furthermore, FIG. 18A illustrates the EPS bearer context stored for each PDN connection. As illustrated in the drawing, the EPS bearer context stored for each PDN connection includes an IP Address, a PDN type, an S-GW Address in Use (control information), an S-GW TEID for S5/S8 (control information), an S-GW Address in Use (user data), an S-GW GRE Key for downlink traffic (user data), a P-GW IP address for S5/S8 (control information), a P-GW TEID for S5/S8 (control information), a P-GW Address in Use (user data), a P-GW GRE Key for uplink traffic (user data), an MS Info Change Reporting support indication, an MS Info Change Reporting Action, a CSG Information Reporting Action, a Presence Reporting Area Action, a BCM, a Default Bearer, and EPS PDN Charging Characteristics.

The IP Address indicates an IP address assigned to the UE for this PDN connection. The IP address may be an IPv4 and/or IPv6 prefix.

The PDN type indicates the type of the IP address. The PDN type indicates IPv4, IPv6, or IPv4v6, for example.

The S-GW Address in Use (control information) is an IP address of the SGW which is recently used for transmission of the control information.

The S-GW TEID for S5/S8 (control information) is a TEID of the SGW used for transmission and/or reception of the control information between the SGW and the PGW.

The S-GW Address in Use (user data) is an IP address of the SGW which is recently used for transmission of the user data in the interface between the SGW and the PGW.

The S-GW GRE Key for downlink traffic (user data) is the GRE key which is assigned to be used in the downlink communication of the user data from the PGW to the SGW at the interface between the SGW and the PGW.

The P-GW IP address for S5/S8 (control information) is an IP address of the PGW used for communication of the control information.

The P-GW TEID for S5/S8 (control information) is a TEID of the PGW for communication of the control information which uses the interface between the SGW and the PGW.

The P-GW Address in Use (user data) is an IP address of the PGW which is recently used for transmission of the user data which uses the interface between the SGW and the PGW.

The P-GW GRE Key for uplink traffic (user data) is the GRE key which is assigned for the uplink communication of the user data between the SGW and the PGW, that is, transmission of the user data from the SGW to the PGW.

The MS Info Change Reporting support indication indicates that the MME and/or the SGSN supports a notification process of user location information and/or user CSG information.

The MS Info Change Reporting Action is information indicating whether the MME and/or the SGSN is requested to transmit a change in the user location information.

The CSG Information Reporting Action is information indicating whether the MME and/or the SGSN is requested to transmit a change in the user CSG information. This information is separately indicated (a) for a CSG cell, (b) for a hybrid cell in which a user is a CSG member, (c) for a hybrid cell in which the user is not the CSG member, or for a combination thereof.

The Presence Reporting Area Action indicates necessity of notification of the change as to whether or not the UE is present in a presence reporting area. This information element separates into identification information of the presence reporting area and an element included in the presence reporting area.

The Bearer Control Mode (BCM) indicates a control state of a bearer negotiated with respect to the GERAN/UTRAN.

The Default Bearer is identification information for identifying a default bearer included in the PDN connection.

The EPS PDN Charging Characteristics are a charging performance of the PDN connection. The charging performance may indicate, for example, normal, prepaid, a flat rate, hot billing.

Furthermore, FIG. 18B illustrates the EPS bearer context stored for each EPS bearer. As illustrated in the drawing, the EPS bearer context includes an EPS Bearer Id, a TFT, an S-GW Address in Use (user data), an S-GW TEID for S5/S8

(user data), a P-GW IP address for S5/S8 (user data), a P-GW TEID for S5/S8 (user data), an EPS Bearer QoS, and a Charging Id.

The EPS Bearer Id is identification information identifying the access of the UE via the E-UTRAN. The TFT is an abbreviation of a "Traffic Flow Template", and indicates all packet filters associated with the EPS bearer.

The S-GW Address in Use (user data) is an IP address of the SGW which is recently used for transmission of the user data. The S-GW TEID for S5/S8 (user data) is a TEID of the SGW for communication of the user data which uses the interface between the SGW and the PGW.

The P-GW IP address for S5/S8 (user data) is an IP address of the PGW for the user data received from the PGW.

The P-GW TEID for S5/S8 (user data) is a TEID of the PGW for communication of the user data between the SGW and the PGW.

The EPS Bearer QoS indicates the QoS of the bearer, and may include an ARP, a GBR, an MBR, and a QCI. Here, the ARP is information representing the priority relating to maintaining the bearer. Additionally, the Guaranteed Bit Rate (GBR) represents a band guaranteed bit rate, and the Maximum Bit Rate (MBR) represents the maximum bit rate. The QCI can be classified in accordance with presence or absence of band control, an allowable delay time, a packet loss rate, or the like. The QCI includes information indicating the priority.

The Charging Id is charging identification information for identifying the record relating to charging generated in the SGW and the POW.

1.2.5. C-SGN Configuration

Figure 19:
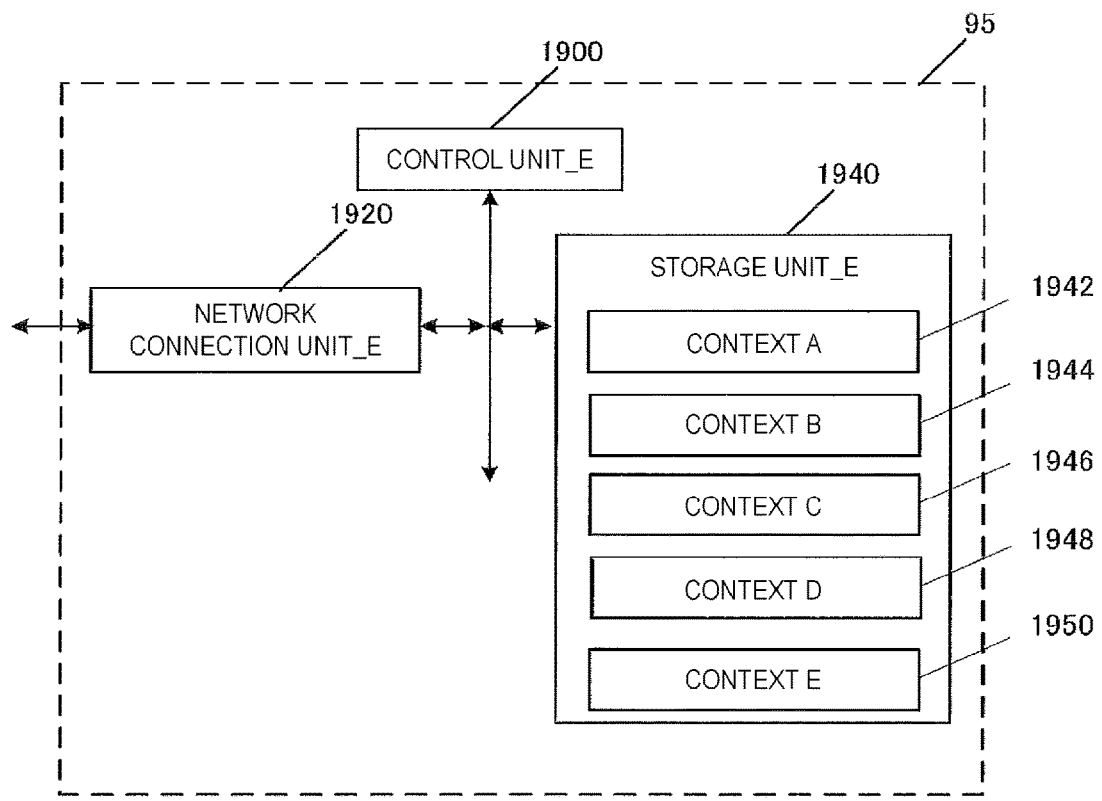
FIG. 19 is a diagram illustrating a device configuration of a C-SGN.

Hereinafter, the device configuration of the C-SGN_A 95 will be described. FIG. 19 illustrates the device configuration of the C-SGN_A 95. As illustrated in FIG. 19, the C-SGN_A 95 includes a network connection unit_E 1920, a control unit_E 1900, and a storage unit_E 1940. The network connection unit_E 1920 and the storage unit_E 1940 are connected to the control unit_E 1900 via a bus.

The control unit_E 1900 is a function unit for controlling the C-SGN_A 95. The control unit_E 1900 implements various processes by reading out and executing various programs stored in the storage unit_E 1940.

The network connection unit_E 1920 is a function unit through which the C-SGN_A 95 connects to the eNB_A 45 and/or the HSS_A 50 and/or the PDN_A 5.

The storage unit_E 1940 is a function unit for storing programs, data, and the like necessary for each operation of the C-SGN_A 95. The storage unit_E 1940 is constituted of, for example, a semiconductor memory, a Hard Disk Drive (HDD), or the like.

The storage unit_E 1940 may store at least the identification information and/or the control information and/or the flag and/or the parameter included in the control message transmitted and/or received in the attach procedure and the data transmission procedure, which will be described in 1.3 and 1.4.

The storage unit_E 1940 stores a context A 1942, a context B 1944, a context C 1946, and a context D 1948 as illustrated in the drawing.

The context A 1942 may be the MME context 642 illustrated in FIG. 6. Additionally, the context B 1944 may be the security context 648 illustrated in FIG. 6. Additionally, the context C 1946 may be the MME Emergency Configuration Data 650 illustrated in FIG. 6.

Additionally, the context D 1948 may be the EPS bearer context 1342 illustrated in FIG. 13. Additionally, the context E 1950 may be the EPS bearer context 1642 illustrated in FIG. 16.

Note that in a case that the context A 1942 to the context E 1950 include the same information element, such information element may not necessarily be redundantly stored in the storage unit_E 1940, and may be stored in any context at least.

Specifically, for example, the IMSI may be included in each of the context A 1942, the context D 1948, and the context E 1950, or may be stored in any context.

1.2.6. UE Configuration

Figure 20:
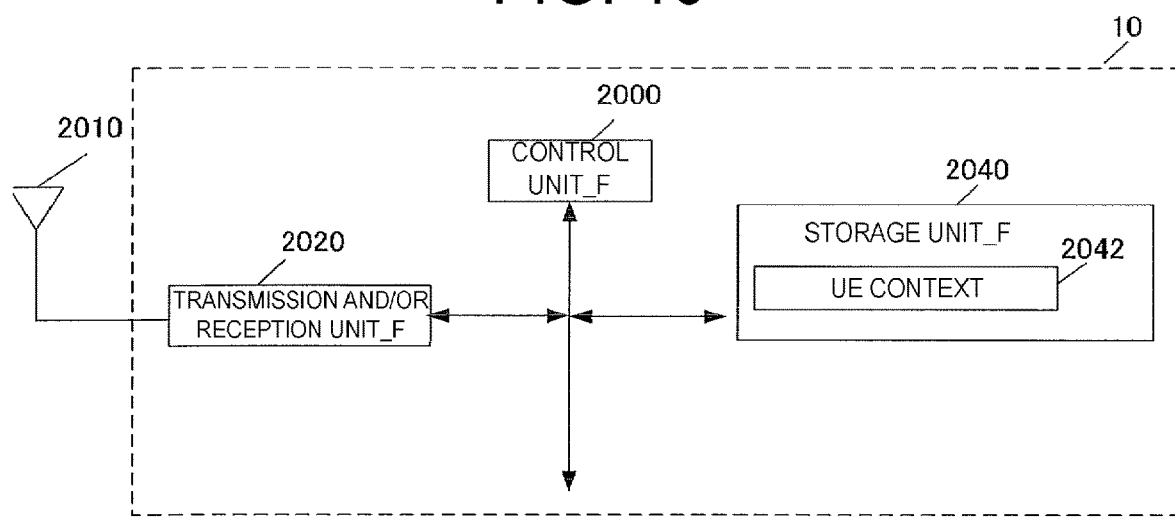
FIG. 20 is a diagram illustrating a device configuration of a UE.

FIG. 20 illustrates a device configuration of the UE_A 10. As illustrated in FIG. 20, the UE_A 10 includes a transmission and/or reception unit 2020, a control unit 2000, and a storage unit 2040. The transmission and/or reception unit 2020 and the storage unit 2040 are connected to the control unit 2000 via a bus.

The control unit 2000 is a function unit for controlling the UE_A 10. The control unit 2000 implements various processes by reading out and executing various programs stored in the storage unit 2040.

The transmission and/or reception unit 2020 is a function unit through which the UE_A 10 connects to an IP access network via an LTE base station. Furthermore, the external antenna 2010 is connected to the transmission and/or reception unit 2020.

The storage unit 2040 is a function unit for storing programs, data, and the like necessary for each operation of the UE_A 10. The storage unit 2040 is constituted of, for example, a semiconductor memory, a Hard Disk Drive (HDD), or the like.

As illustrated in FIG. 20, the storage unit 2040 stores a UE context 2042. Hereinafter, information elements stored in the storage unit 2040 will be described.

FIG. 21A illustrates information elements included in the UE context stored for each UE. As illustrated in the drawing, the UE context stored for each UE includes an IMSI, an EMM State, a GUTI, an ME Identity, a Tracking Area List, a last visited TAI, a Selected NAS Algorithm, a Selected AS Algorithm, an eKSI, K_ASME, NAS Keys and COUNT, a TIN, UE Specific DRX Parameters, an Allowed CSG list, and an Operator CSG list. The IMSI is permanent identification information of a subscriber.

The EMM State indicates a mobility management state of the UE. For example, the EMM State may be EMM-REGISTERED in which the UE is registered with the network (registered state) or EMM-DEREGISTERD in which the UE is not registered with the network (deregistered state).

The GUTI is an abbreviation of "Globally Unique Temporary Identity," and is temporary identification information about the UE. The GUTI includes the identification information about the MME (Globally Unique MME Identifier (GUMMEI)) and the identification information about the UE in a specific MME (M-TMSI).

The ME identity is an ID of an ME, and may be the IMEI/IMISV, for example. The Tracking Area List is a list of the tracking area identification information which is assigned to the UE. The last visited TAI is the tracking area identification information included in the Tracking Area List, and is identification information of the latest tracking area that the UE visits.

The Selected NAS Algorithm is a selected security algorithm of the NAS. The Selected AS Algorithm is a selected security algorithm of the AS.

The eKSI is a key set indicating the K_ASME. The eKSI may indicate whether a security key acquired by a security authentication of the UTRAN or the E-UTRAN is used.

The K_ASME is a key for E-UTRAN key hierarchy generated based on the keys CK and IK.

The NAS Keys and COUNT includes the key K_NASint, the key K_NASenc, and the NAS COUNT. The K_NASint is a key for encryption between the UE and the MME, the K_NASenc is a key for safety protection between the UE and the MME. Additionally, the NAS COUNT is a count which starts a count in a case that a new key by which security between the UE and the MME is established is configured.

The Temporary Identity used in Next update (TIN) is temporary identification information used in the UE in an attach procedure or a location information update procedure (RAU/TAU).

The UE Specific DRX Parameters are a Discontinuous Reception (DRX) cycle length of the selected UE.

The Allowed CSG list is a list of the PLMN associated with a CSG ID of a member to which the allowed UE belongs, under the control of both the user and the operator.

The Operator CSG list is a list of the PLMN associated with the CSG ID of a member to which the allowed UE belongs, under the control of only the operator.

Next, FIG. 21B illustrates the UE context for each PDN connection. As illustrated in FIG. 21B, the UE context for each PDN connection includes an APN in Use, an APN-AMBR, an Assigned PDN Type, an IP Address, a Default Bearer, and a WLAN offloadability.

The APN in Use is APN recently utilized. This APN may include identification information about the network and identification information about a default operator.

The APN-AMBR indicates the maximum value of the MBR of the uplink communication and the downlink communication for sharing the Non-GBR bearers (non-guaranteed bearers). The APN-AMBR is established for each APN.

The Assigned PDN Type is a type of the PDN assigned from the network. The Assigned PDN Type may be IPv4, IPv6, or IPv4v6, for example.

The IP Address is an IP address assigned to the UE through the PDN connection, and may be an IPv4 address or an IPv6 prefix.

The Default Bearer is EPS bearer identification information for identifying a default bearer in this PDN connection.

The WLAN offloadability is WLAN offload permission information indicating whether a communication associated with this PDN connection allows for offload to the WLAN using an interworking function between the WLAN and the 3GPP, or maintains the 3GPP access.

FIG. 21C illustrates the UE context for each bearer stored in the storage unit of the UE. As illustrated in the drawing, the UE context for each bearer includes an EPS Bearer ID, a TI, an EPS bearer QoS, and a TFT. The EPS Bearer ID is identification information of the bearer.

The TI is an abbreviation of a "Transaction Identifier", and is identification information identifying a bidirectional message flow (Transaction).

The TFT is an abbreviation of a "Traffic Flow Template", and indicates all packet filters associated with the EPS bearer.

1.3. Description of Communication Procedure

Next, a communication procedure according to the present embodiment will be described. First, an example of an attach procedure will be described.

1.3.1. Attach Procedure Example

Hereinafter, an attach procedure will be described. Note that the attach procedure is a procedure which is started on the initiative of the UE_A 10, and a procedure for establishing the PDN connection by connecting to the core network_A 90. A trigger when the UE_A 10 starts the attach procedure may be a time when the power is supplied to the terminal, or the like. Additionally, the UE_A 10 may start at an arbitrary timing in a case that the UE_A 10 is not connected to the core network_A 90 regardless of the above.

Here, before describing the detailed steps of the attach procedure, in order to avoid redundant descriptions, primary identification information used in the present procedure will be described beforehand.

First identification information in the present embodiment is information for encryption or decryption of Up Link (UL) user data transmitted by the UE_A 10 or a Non Access Stratum (NAS) message including the UL user data.

To be more specific, the first identification information may be an information group including one or more of an eUTRAN Key Set Identifier (eKSI), an SAE Temporary Mobile Subscriber Identity (S-TMSI), an encryption algorithm, or the like.

Here, the UL user data are user data transmitted by the UE_A 10, and may be application data. Note that UL user data may be included in an IP packet transmitted using an IP address associated with the PDN connection. The UL user data in the present embodiment may be application data itself, or an IP packet including the application data.

Second identification information in the present embodiment is information indicating that the PDN connection to be established is the PDN connection for performing machine type communication in which a small data packet is transmitted at a low frequency.

To be more specific, the second identification information may be a Connectivity Type indicating that the PDN connection to be established is the PDN connection for performing the machine type communication in which the small data packet is transmitted at a low frequency.

Note that the small data packet is the UL user data. Furthermore, the UL user data with a small data size may be particularly assumed to be a small data packet.

Third identification information in the present embodiment is an Access Point Name (APN) in which the establishment of the PDN connection for performing the machine type communication in which the small data packet is transmitted at a low frequency is allowed.

Fourth identification information in the present embodiment may be identification information indicating that connectionless communication is performed. In other words, the fourth identification information may be information indicating that the UE_A 10 does not transit to an active mode, and transits to an idle mode or maintains the idle mode.

Note that the C-SGN_A 95 or the MME_A 40 may manage and synchronize the state of the UE_A 10.

To be more specific, the fourth identification information may be a flag included in an RRC message and/or a flag included in a NAS message. Note that in the present embodiment, the NAS message refers to a control message of a NAS protocol.

Additionally, in the present embodiment, in a case that two or more kinds of identification information among the first to fourth identification information are transmitted while being included in the same control message, each identification information may be included and transmitted, or one kind of identification information having meanings indicated by each identification information may be included in the control message. Note that the identification information may be an information element configured as a flag or a parameter.

Additionally, the connectionless communication in the present embodiment may be communication at least performing a process in which the UE_A 10 transmits the NAS message including the data packet to the eNB_A 45 by including in the RRC message. And/or, the connectionless communication may be communication transmitting and/or receiving the data packet between the UE_A 10 and the eNB_A 45 without establishing the RRC connection.

And/or, the connectionless communication may be communication transmitting and/or receiving the data packet during the UE_A 10 being in the idle state.

Figure 22:
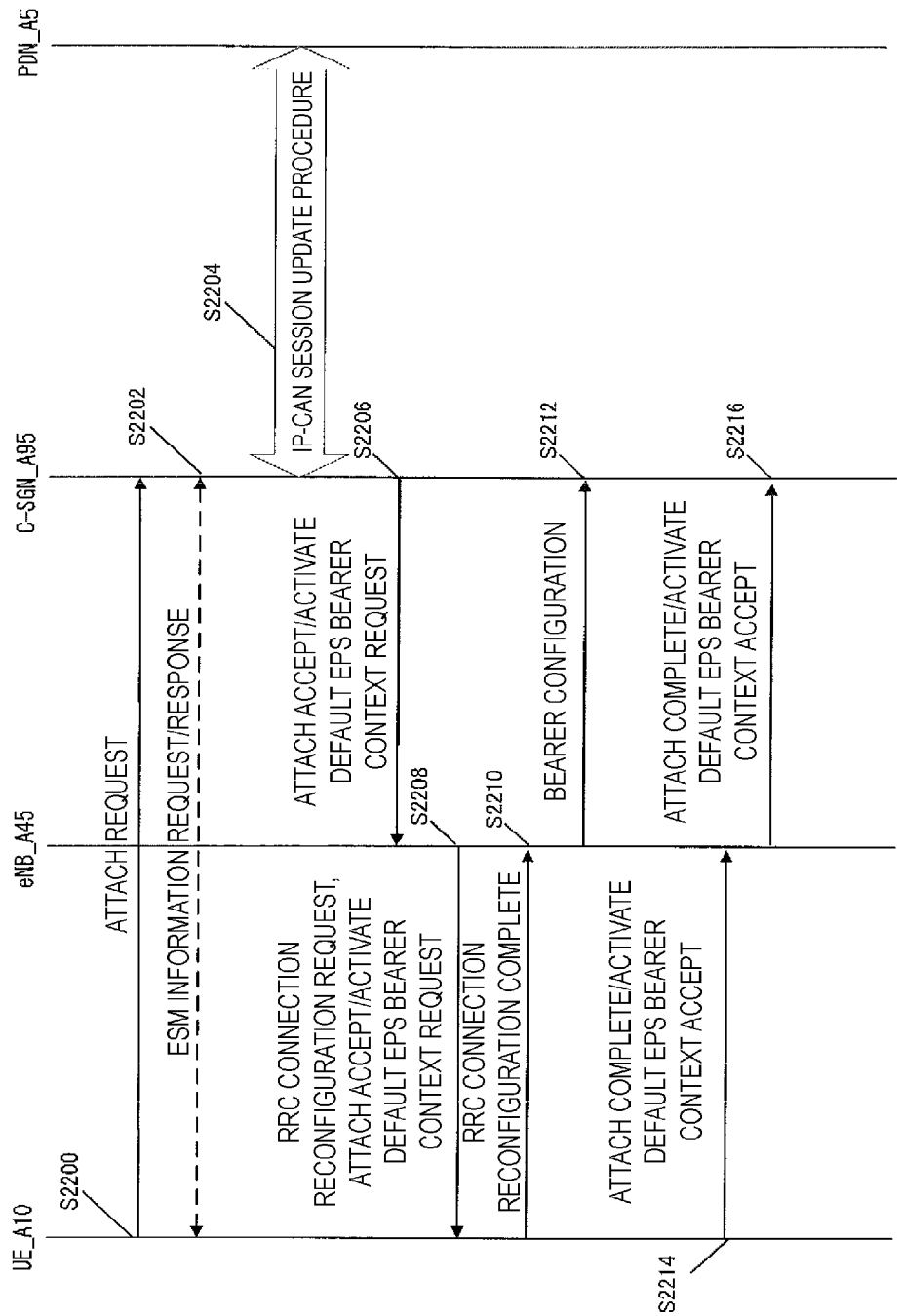
FIG. 22 is a diagram illustrating an attach procedure.

Hereinafter, the steps of the attach procedure will be described using FIG. 22. First, the UE10_A 10 transmits an ATTACH REQUEST message to the C-SGN_A 95 (S2200). Note that the UE_A 10 may transmit the ATTACH REQUEST message to the eNB_A 45, and the transmitted ATTACH REQUEST message may be transferred to the C-SGN_A 95 via the eNB 45.

Additionally, the UE_A 10 may transmit a PDN connectivity request message with the ATTACH REQUEST message. Hereinafter, in the description of the present embodiment, the ATTACH REQUEST message is described as a message in which the ATTACH REQUEST message and the PDN connectivity request message are combined. Furthermore, in the description of the present embodiment, in a case that an expression "identification information is included in the ATTACH REQUEST message" is used, the expression means that the identification information is included in the ATTACH REQUEST message and/or the PDN connectivity request message.

The UE_A 10 may include at least the third identification information and/or the fourth identification information in the ATTACH REQUEST message. The UE_A 10 may request establishment of the PDN connection for performing machine type communication in which a small data packet is transmitted at a low frequency, by transmitting the ATTACH REQUEST message including the third identification information.

Here, the third identification information and/or the fourth identification information may not be transmitted to the C-SGN_A 95 by being included in the ATTACH REQUEST message, and may instead be transmitted while being included in a control message different from the attach request in the attach procedure.

For example, after transmitting the ATTACH REQUEST message, the UE_A 10 may execute a request of EPS Session Management (ESM) information, and a transmission and/or reception procedure of a control message which responds based on the request (S2202).

To be more specific, the C-SGN_A 95 transmits an ESM request message to the UE_A 10. The UE_A 10 receives the ESM request message, and transmits a response message to the C-SGN_A 95. At this time, the UE_A 10 may transmit the third identification information and/or the fourth identification information included in the response message.

Here, the UE_A 10 may encrypt and transmit the ESM response message. Furthermore, the UE_A 10 may receive information for encrypting the ESM response message from the C-SGN_A 95. The C-SGN_A 95 may transmit information for encrypting the NAS message to the UE_A 10 with the reception of the ATTACH REQUEST message. Here, the information for encrypting the NAS message may be the first identification information. Note that the NAS message for which the information for encrypting the NAS message is transmitted may be a Security Mode Command message.

The C-SGN_A 95 receives the ATTACH REQUEST message. Furthermore, the C-SGN_A 95 acquires the third identification information and/or the fourth identification information based on the reception of the ATTACH REQUEST message or the reception of the ESM response message.

The C-SGN_A 95 may determine to establish the PDN connection for the UE_A 10 based on information included in the ATTACH REQUEST message and subscriber information. Additionally, on the basis of the third identification information and/or the fourth identification information and/or the subscriber information, the establishment of the PDN connection for performing the machine type communication in which the small data packet is transmitted at a low frequency may be determined. Note that the PDN connection for performing the machine type communication in which the small data packet is transmitted at a frequency may be a PDN connection for performing connectionless communication.

As described above, on the basis of presence or absence of the third identification information and/or the fourth identification information, the C-SGN_A 95 approves and determines whether to establish the PDN connection for performing the machine type communication in which the small data packet is transmitted at a low frequency or to establish the known PDN connection. Hereinafter, the approval and determination process described above is referred to as a first determination and described.

In a case of determining to establish the PDN connection, the C-SGN_A 95 starts an IP-CAN session update procedure (S2204). The IP-CAN session update procedure may be the same as the known procedure, and therefore detailed descriptions thereof will be omitted.

The C-SGN_A 95 transmits an ATTACH ACCEPT message to the eNB_A 45 with completion of the IP-CAN session update procedure (S2206).

Additionally, the C-SGN_A 95 may transmit an ACTIVATE DEFAULT EPS BEARER CONTEXT REQUEST message with the ATTACH ACCEPT message. Hereinafter, in the description of the present embodiment, the ATTACH ACCEPT message is described as a message in which the ATTACH ACCEPT message and the ACTIVATE DEFAULT EPS BEARER CONTEXT REQUEST message are combined. Furthermore, in the description of the present embodiment, in a case that an expression "identification information is included in the ATTACH ACCEPT message" is used, the expression means that the identification information is included in the ATTACH ACCEPT message and/or the ACTIVATE DEFAULT EPS BEARER CONTEXT REQUEST message.

The C-SGN_A 95 may include at least the second identification information and/or the third identification information and/or the fourth identification information in the ATTACH ACCEPT message.

Note that the C-SGN_A 95 may make a connection state for the UE_A 10 the idle mode with the transmission of the ATTACH ACCEPT message based on the first determination. In other words, the C-SGN_A 95 may make the connection state for the UE_A 10 the idle mode based on the establishment of the PDN connection for performing the machine type communication in which the small data packet is transmitted at a low frequency. Additionally, in a case of transmitting the ATTACH ACCEPT message for establishing the known PDN connection, the C-SGN_A 95 may perform transition to the active mode with the transmission of the message.

The eNB_A 45 receives the ATTACH ACCEPT message, and transmits the RRC message including the ATTACH ACCEPT message to the UE_A 10 (S2208). Note that the RRC message may be an RRC connection reconfiguration request message.

The UE_A 10 receives the RRC message including the ATTACH ACCEPT message. Furthermore, in a case that the second identification information and/or the third identification information and/or the fourth identification information is included in the ATTACH ACCEPT message, the UE_A 10 acquires each identification information.

The UE_A 10 establishes the PDN connection based on the reception of the ATTACH ACCEPT message.

The UE_A 10 may recognize and detect, based on the second identification information and/or the third identification information and/or the fourth identification information, that the established PDN connection is the PDN connection for performing the machine type communication in which the small data packet is transmitted at a low frequency. And/or, the UE_A 10 may recognize and detect, based on the second identification information and/or the third identification information and/or the fourth identification information, that the established PDN connection is the PDN connection which performs connectionless communication. Hereinafter, the recognition and determination process described above is referred to as a second determination and described.

Furthermore, in order to respond to the received RRC message, the UE_A 10 transmits the RRC message to the eNB_A 45 (S2210). The RRC message may be an RRC connection reconfiguration complete message.

The eNB_A 45 receives an RRC connection reconfiguration message, and transmits a bearer configuration message to the C-SGN_A 95 based on the reception (S2212).

Additionally, the UE_A 10 transmits the RRC message including an ATTACH COMPLETE message to the eNB_A 45 based on the reception of the ATTACH ACCEPT message (S2214).

Additionally, the UE_A 10 may transmit an ACTIVATE DEFAULT EPS BEARER CONTEXT ACCEPT message with the ATTACH COMPLETE message. Hereinafter, in the description of the present embodiment, the ATTACH COMPLETE message is described as a message in which the ATTACH COMPLETE message and the ACTIVATE DEFAULT EPS BEARER CONTEXT ACCEPT message are combined. Furthermore, in the description of the present embodiment, in a case that an expression "identification information is included in the ATTACH COMPLETE message" is used, the expression means that the identification information is included in the ATTACH COMPLETE message and/or the ACTIVATE DEFAULT EPS BEARER CONTEXT ACCEPT message.

Note that the RRC message to be transmitted while including the ATTACH COMPLETE message may be a Direct Transfer message.

The eNB_45 receives the RRC message including the ATTACH COMPLETE message, and transmits the ATTACH COMPLETE message to the C-SGN_A 95 (2216).

Additionally, the UE_A 10 may transit to the idle mode with the transmission of the ATTACH COMPLETE message based on the second determination.

Alternatively, the UE_A 10 may receive the RRC message from the eNB_A 45 as the response for the Direct Transfer message including the ATTACH COMPLETE message, and may transit to the idle mode with the reception of the response message based on the second determination.

As a more detailed example, the UE_A 10 may transmit identification information indicating the transition to the idle mode included in the ATTACH COMPLETE message and/or the Direct Transfer message.

Furthermore, the eNB_A 45 which receives the Direct Transfer message may transmit the RRC message to be a response to the UE_A 10 based on the received identification information. As described above, the RRC message to be the response may be a message for allowing the transition to the idle mode.

In other words, the UE_A 10 can select whether to transit to the idle mode or to maintain the active mode based on the second determination.

For example, in a case of receiving an IP address included in the ATTACH ACCEPT message, the UE_A 10 can transit to the idle mode. Alternatively, in a case that it is necessary to acquire an IPv6 prefix by a stateless address configuration procedure or the like after completion of the attach procedure, the UE_A 10 can maintain the active mode. In this case, the UE_A 10 executes the stateless address configuration procedure while taking the initiative, and can acquire the IPv6 prefix. Furthermore, using the IPv6 prefix, an IPv6 address can be generated and acquired.

The C-SGN_A 95 may transit the connection state for the UE_A 10 to the idle mode based on the reception of the ATTACH COMPLETE message.

In other words, the C-SGN_A 95 may manage the state of the UE_A 10 as the idle mode based on the transmission of the ATTACH ACCEPT message or the reception of the ATTACH COMPLETE message.

Note that the UE_A 10 can acquire the UE context illustrated in FIGS. 21A to 21C from the core network_A 90 by the attach procedure and store the context.

Additionally, the C-SGN_A 95 can acquire each of the contexts A to E illustrated in FIG. 19 from the UE_A 10, the eNB_A 45, or the HSS_A 50 by the attach procedure and store the contexts.

By the above-described steps, the UE_A 10 establishes the PDN connection, and completes the attach procedure.

Note that although the attach procedure is described in a case that the core network_A 90 in the attach procedure example described above is a core network configured by including the C-SGN_A 95 described using FIGS. 3A and 3B, the core network_A 90 may be a core network configured by including the PGW_A 30, the SGW_A 35, the MME_A 40, or the like as described using FIGS. 2A and 2B.

In this case, the NAS message such as the ATTACH REQUEST message, the ATTACH COMPLETE message, or the like transmitted by the UE_A 10 described in this procedure is received by the MME 45, not by the C-SGN_A 95.

Accordingly, the reception and the processes of the NAS message by the C-SGN_A 95 in the above description can be replaced with those performed by the MME_A 40.

Furthermore, the transmission and the processes of the NAS message such as the ATTACH ACCEPT message or the like by the C-SGN_A 95 in the above description can be replaced with those performed by the MME_A 40.

1.3.2. UL User Data Transmission Procedure Example

Next, steps in which the UE_A 10 which establishes the PDN connection transmits UL user data will be described. Here, before describing the detailed steps, in order to avoid redundant descriptions, primary identification information used in the present procedure will be described beforehand.

Fifth identification information in the present embodiment is information which indicates to perform the machine type communication in which the small data packet is transmitted at a low frequency.

To be more specific, the fifth identification information may be an Establishment Cause indicating to perform the machine type communication in which the small data packet is transmitted at a low frequency.

Sixth identification information in the present embodiment is identification information indicating that connectionless communication is performed. In other words, the sixth identification information may be information indicating that transition to the idle mode is performed or the idle mode is maintained without transition to the active mode being performed. For example, the sixth identification information may be information, which indicates a mode in which the connectionless communication is performed, for identifying the mode. Additionally, the sixth identification information may be the same identification information as the fourth identification information.

Note that the sixth identification information may be a flag included in the RRC message, or a parameter included in the RRC message header.

Seventh identification information in the present embodiment is information indicating that the NAS message including a small data packet is included in the RRC message.

Note that the seventh identification information may be the flag included in the RRC message, or the parameter included in the RRC message header. To be more specific, the seventh identification information is identification information indicating that the NAS message is included in the RRC message including the seventh identification information. Furthermore, the NAS message may be the NAS message including UL user data. Accordingly, the seventh identification information may be identification information indicating that the NAS message including the UL user data is included in the RRC message including the seventh identification information. In other words, the seventh identification information is information indicating that the NAS message is transmitted while being piggybacked on the RRC message before establishing a Signaling Radio Bearer 1 (SRB 1) of the RRC. Note that the SRB 1 is a radio bearer used for the NAS message and the RRC message before establishing an SRB 2. Additionally, the SRB 2 is configured after security activation.

Eighth identification information in the present embodiment is information indicating completion of transmission of the NAS message including the small data packet.

Note that the eighth identification information may be the flag included in the RRC message, or the parameter included in the RRC message header.

Ninth identification information in the present embodiment is information indicating incompletion of the transmission of the NAS message including the small data packet. In other words, the ninth identification information is information indicating that the transmission of the NAS message including the small data packet is performed again.

Note that the ninth identification information may be the flag included in the RRC message, or the parameter included in the RRC message header.

Tenth identification information in the present embodiment is information indicating that the NAS message is transmitted while being included in the RRC message. Note that the RRC message may be a RRC Connection Request message. In other words, the tenth identification information is information indicating that the NAS message is transmitted before connection completion of the RRC. In other words, the tenth identification information is information indicating that the NAS message is transmitted while being piggybacked on the RRC message before establishing the Signaling Radio Bearer 1 (SRB 1) of the RRC. The SRB 1 is a radio bearer used for the NAS message and the RRC message before establishing the SRB 2. The SRB 2 is configured after the security activation.

Note that the tenth identification information may be the flag included in the RRC message, or the parameter included in the RRC message header.

Additionally, in the present embodiment, in a case that two or more kinds of identification information among the first to tenth identification information are transmitted while being included in the same control message, each identification information may be included and transmitted, or one kind of identification information having meanings indicated by each identification information may be included in the control message. Note that the identification information may be an information element configured as the flag or the parameter. Additionally, on the basis of determination of any one or multiple kinds of the first to fourth identification information in a NAS layer, any one or multiple kinds of the fifth to tenth identification information may be determined in the NAS layer, any one or multiple kinds of the fifth to tenth identification information may be provided to an RRC layer from the NAS layer.

Figure 23:
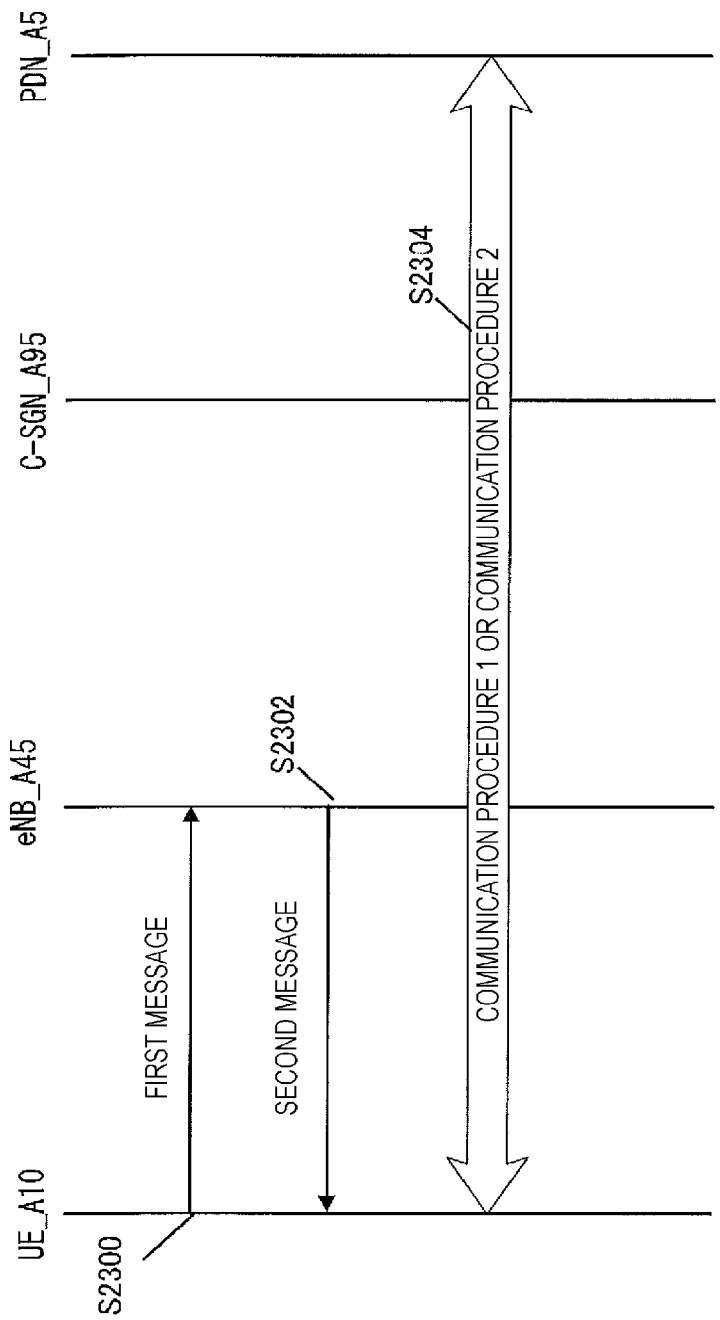
FIG. 23 is a diagram illustrating data transmission.

Hereinafter, transmission steps of the UL user data will be described using FIG. 23. The UE_A 10 transmits a first message to the eNB_A 45. The first message is a message for requesting at least transmission timing information and resource allocation information, the UE_A 10 transmits the first message at least including a randomly selected preamble to the eNB_A 45 (S2300).

Note that, the first message is a control signal of a Physical layer, may be a Random Access CHannel (RACH) Preamble message of a Message 1. The first message may be transmitted using a Physical Random Access CHannel (PRACH).

Note that the UE_A 10 detects and determines to perform the connectionless communication, and/or detects and determines to transmit the NAS message including the UL user data included in the RRC message. The UE_A 10 may detect and determine these based on the second determination. Hereinafter, the detection and determination of performing the connectionless communication and/or transmitting the NAS message including the user data included in the RRC message are referred to as a third determination and described.

The UE_A 10 may transmit at least the fifth identification information and/or the sixth identification information and/or the tenth identification information included in the first message. Note that the UE_A 10 may include the fifth identification information and/or the sixth identification information and/or the tenth identification information in the first message based on the third determination.

As described above, the UE_A 10 may request to perform the connectionless communication by transmitting at least the fifth identification information and/or the sixth identification information included in the first message. Alternatively, the UE_A 10 may request the transmission timing information and the resource allocation information for transmitting the NAS message including the UL user data included in the RRC message by transmitting the fifth identification information and/or the sixth identification information and/or the tenth identification information included in the first message.

The eNB_A 45 receives the first message, and transmits a second message to the UE_A 10 as a response to the first message (S2302). The second message is transmitted while including at least the transmission timing information and the resource allocation information. To be more specific, the transmission timing information may be a Timing Advance, the resource allocation information may be a UL Grant. The second message is a control signal in a Media Access Control (MAC) layer, and may be transmitted using a Medium Access Control Random Access Response (MAC RAR).

Additionally, in a case of receiving the fifth identification information and/or the sixth identification information, the eNB_A 45 may transmit the transmission timing information for the UE_A 10 transmitting the NAS message including the UL user data included in the RRC message and the resource allocation information included in the second message.

Note that the second message may be a RACH Response message of a Message 2.

A communication procedure after the UE_A 10 receives the second message can branch into a first communication procedure example and a second communication procedure example, which will be described later (S2304). The first communication procedure example is a procedure for performing communication with connectionless, the second communication procedure example is a procedure for performing communication with an established connection.

A condition for branching into the first communication procedure example or the second communication procedure example may be determined as follows.

The UE_A 10 may branch into the first communication procedure example based on the third determination. Alternatively, the UE_A 10 may branch into the first communication procedure example, in a case of receiving the transmission timing information for transmitting the NAS message including the UL user data included in the RRC message and the resource allocation information by the second message.

Furthermore, the UE_A 10 may branch into the second communication procedure example in cases excluding the above-described cases.

1.3.2.1. Description of First Communication Procedure Example

Hereinafter, the first communication procedure example will be described in detail using FIG. 24.

The UE_A 10 receives the second message from the eNB_A 45, and transmits a third message to the eNB_A 45 (S2400).

The UE_A 10 may transmit the NAS message including the UL user data included in the third message based on the third determination. Alternatively, in a case of receiving the transmission timing information for transmitting the NAS message including the UL user data included in the RRC message and the resource allocation information by the second message, the NAS message including the UL user data may be transmitted while being included in the third message.

Note that the UL user data or the NAS message including the UL user data may be encrypted using the first identification information.

Furthermore, in a case that the NAS message including the UL user data is included in the third message, the UE_A 10 may transmit at least the fifth identification information and/or the sixth identification information and/or the seventh identification information and/or the tenth identification information further included in the third message.

Additionally, in a case that all the UL user data to be transmitted can be included in the NAS message, the UE_A 10 may transmit the eighth identification information included in the third message, and may notify completion of the transmission of the UL user data.

Alternatively, in a case that the UL user data to be transmitted remain, the UE_A 10 may transmit the ninth identification information included in the third message, and may notify of incompletion of the transmission of the UL user data and retransmission.

Additionally, presence or absence of the data to be transmitted may be determined from a data residual amount of a buffer which accumulates the UL user data to be transmitted or the like.

Additionally, the third message is the RRC message, and may be the RRC Connection Request message of a Message 3. The third message is not limited thereto, and may be the RRC message including the NAS message in which the UL user data is included. For example, the third message may be the RRC message distinguishable by a message type including the NAS message in which the UL user data is included.

Note that in the present embodiment, the RRC message refers to a control message of a Radio Resource Control (RRC) protocol.

The eNB_A 45 receives the third message. The eNB_A 45 may transmit an Initial UE message of an S Application Protocol (S1AP) including at least the NAS message in which the UL user data is included to the C-SGN_A 95 (S2406).

Here, in a case of receiving the fifth identification information and/or the sixth identification information included in the first message, the NAS message in which the UL user data is included may be included by the eNB_A 45.

Alternatively, in a case of receiving any one or more kinds of identification information among the fifth to ninth identification information included in the third message, the NAS message in which the UL user data is included may be included. Additionally, in cases excluding the above-described cases, a fourth message described in the second communication procedure example which will be described later may be transmitted to the UE_A 10.

The C-SGN_A 95 receives the Initial UE message, confirms the NAS message, and performs decryption (2410).

Furthermore, the C-SGN_A 95 transmits the decrypted UL user data (Decripted Data) to the PDN_A 5 (2412). For example, the data is transmitted to an application server disposed in the PDN_A 5.

The above-described procedures enable the UE_A 10 to transmit the small data packet being the UL user data to the PDN_A 5.

Additionally, the UE_A 10 may transit to the idle mode based on the transmission of the third message, in a case that the NAS message including the UL user data is transmitted while being included in the third message.

Alternatively, as a response to the third message transmitted by the eNB_A 45, the UE_A 10 may receive a complete message, and transit to the idle mode based on the reception of the complete message (S2408).

As described above, the eNB_A 45 may transmit the complete message to the UE_A 10 based on the reception of the third message.

Note that the complete message is a control message of the RRC protocol, may be a message for the UE_A 10 to transit to the idle mode, may be an RRC message which rejects RRC, specifically, the RRC connection establishment or an RRC Connection Release message.

Note that the eNB_A 45 may transmit the complete message for the reception of the third message based on the reception of the fifth identification information and/or the sixth identification information included in the first message.

Note that the eNB_A 45 may transmit the complete message for the reception of the third message based on the reception of any one or more kinds of identification information among the fifth to eighth identification information included in the third message.

Note that the eNB_A 45 may transmit the complete message for the reception of the third message based on the reception of the NAS message including the UL user data included in the third message.

As described above, after the completion of the first communication procedure example, the UE_A 10 can maintain the idle state.

Additionally, the UE_A 10 does not transit to the idle mode immediately after transmitting the third message, as illustrated in S240 of FIG. 24, and may subsequently execute the procedure for transmitting the UL user data to the eNB_A 45 instead.

Hereinafter, using S240 in FIG. 24, steps in which the UE_A 10 subsequently transmits the UL user data will be described.

The eNB_A 45 may not immediately transmit the complete message after receiving the third message, but may instead wait for the RRC message subsequently transmitted from the UE_A 10. To be more specific, in a case of receiving the ninth identification information, the eNB_A 45 may not immediately transmit the complete message, may instead wait for the RRC message subsequently transmitted from the UE_A 10.

In a case of transmitting the third message including the ninth identification information, the UE_A 10 may not transit to the idle mode, but may instead transmit the RRC message including the NAS message including new UL user data to the eNB_A 45 following the transmission of the third message (S2404).

To be more specific, in a case that all the UL user data to be transmitted can be included in the NAS message, the UE_A 10 may transmit the eighth identification information included in the third message, and may notify of the completion of the transmission of the UL user data. Furthermore, in a case that the UL user data to be transmitted remain, the UE_A 10 may transmit the ninth identification information included in the third message, and may notify of incompletion of the transmission of the UL user data and retransmission.

Additionally, presence or absence of the data to be transmitted may be determined from a data residual amount of a buffer which accumulates the UL user data to be transmitted or the like.

Note that a transmission method of the RRC message including the NAS message including the new UL user data and provision of each identification information may be the same as those in the process for the third message. The UE_A 10 may continuously transmit the RRC message including the NAS message including the UL user data with the same process until there is no data to be transmitted.

Additionally, the NAS message including the UL user data is the RRC message, and may be the RRC Connection Request message of a Message 3. The third message is not limited thereto, and may be the RRC message including the NAS message in which the UL user data is included. For example, the message may be the RRC message distinguishable by a message type including the NAS message in which the UL user data is included.

Additionally, in the above-described example, although an example in which the UE_A 10 immediately transmits the RRC message including the NAS message after transmitting the third message is described, the UE_A 10 is not limited thereto, and may receive a response message from the eNB_A 45 after transmitting the third message (S2402). The UE_A 10 may transmit the RRC message including the NAS message based on the reception of the response message.

Note that in a case that the ninth identification information is included in the third message, the eNB_A 45 may transmit the response message, not the complete message.

Note that the response message is the RRC message, and may be a message indicating that the RRC message including the NAS message including the UL user data may be received.

As described above, the eNB_A 45 may transmit the complete message to the UE_A 10 in a case of receiving the eighth identification information, and may transmit the response message in a case of receiving the ninth identification information. Furthermore, the UE_A 10 may transmit the RRC message including the NAS message including the UL user data based on the reception of the response message transmitted by the eNB_A 45.

Figure 24:
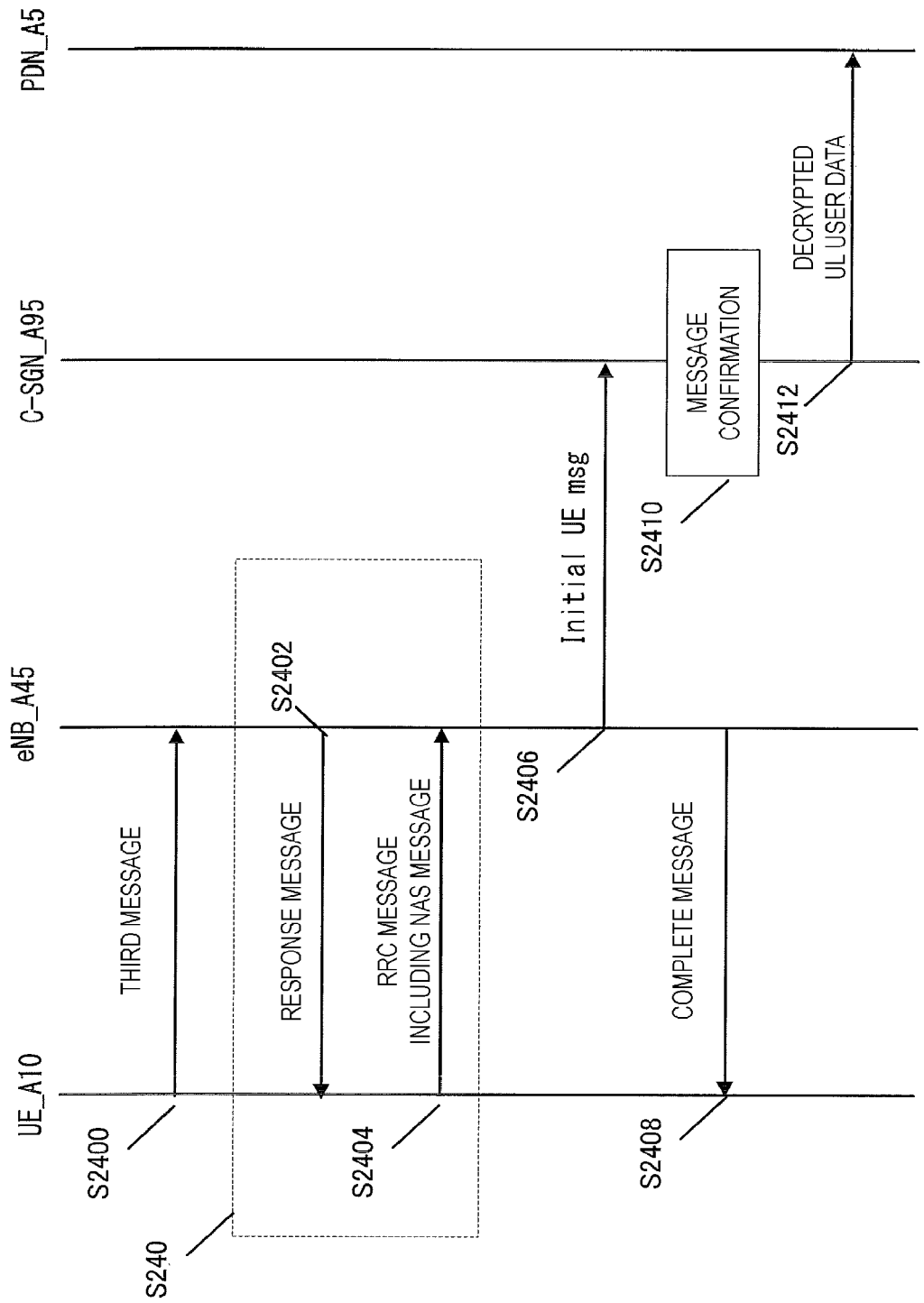
FIG. 24 is a diagram illustrating a first communication procedure.

The transmission procedure described using S240 in FIG. 24 may be iteratively continued until the UE_A 10 completes the transmission of the UL user data. Note that when transmitting the last UL user data, the RRC message is transmitted while including at least the eighth identification information. Furthermore, the UE_A 10 may transit to the idle mode in a case of completing the transmission of the user data to be transmitted.

Alternatively, in a case of receiving a message for the transition of the UE_A 10 to the idle mode from the eNB_A 45, the UE_A 10 transits to the idle mode. Specifically, by receiving the RRC message which rejects the RRC connection establishment or the RRC Connection Release message, the UE_A 10 may transit to the idle mode.

In a case of receiving the RRC message including the eighth identification information and the NAS message including the UL user data, the eNB_A 45 may transmit such a message for the transition to the idle mode to the UE_A 10.

Furthermore, every time the third message and the following RRC message are received, the eNB_A 45 may not transmit the Initial UE message of the S1 Application Protocol (S1AP) including the NAS message including the UL user data to the C-SGN_A 95, but may instead accumulate the NAS message including the UL user data until receiving the RRC message including the eighth identification information, and transmit the multiple NAS messages included in the Initial UE message of one S1 Application Protocol (S1AP) to the C-SGN_A 95.

In other words, in a case that the eighth identification information is not included in the RRC message in which the NAS message including the UL user data is included and/or in a case that the ninth identification information is included in the RRC message in which the NAS message including the UL user data is included, the multiple NAS messages including the UL user data may be continuously accumulated. Furthermore, in a case that the RRC message including the eighth identification information is received and/or in a case that the ninth identification information is not included in the RRC message in which the NAS message including the UL user data is included, the Initial UE message including all the NAS messages including the UL user data may be transmitted.

By the above-described procedures, the UE_A 10 can transmit the small data packet being the UL user data to the PDN_A 5. Furthermore, after the completion of the first communication procedure example, the UE_A 10 can transit to the idle state, or maintain the idle state.

1.3.2.2. Description of Second Communication Procedure Example

Figure 5:
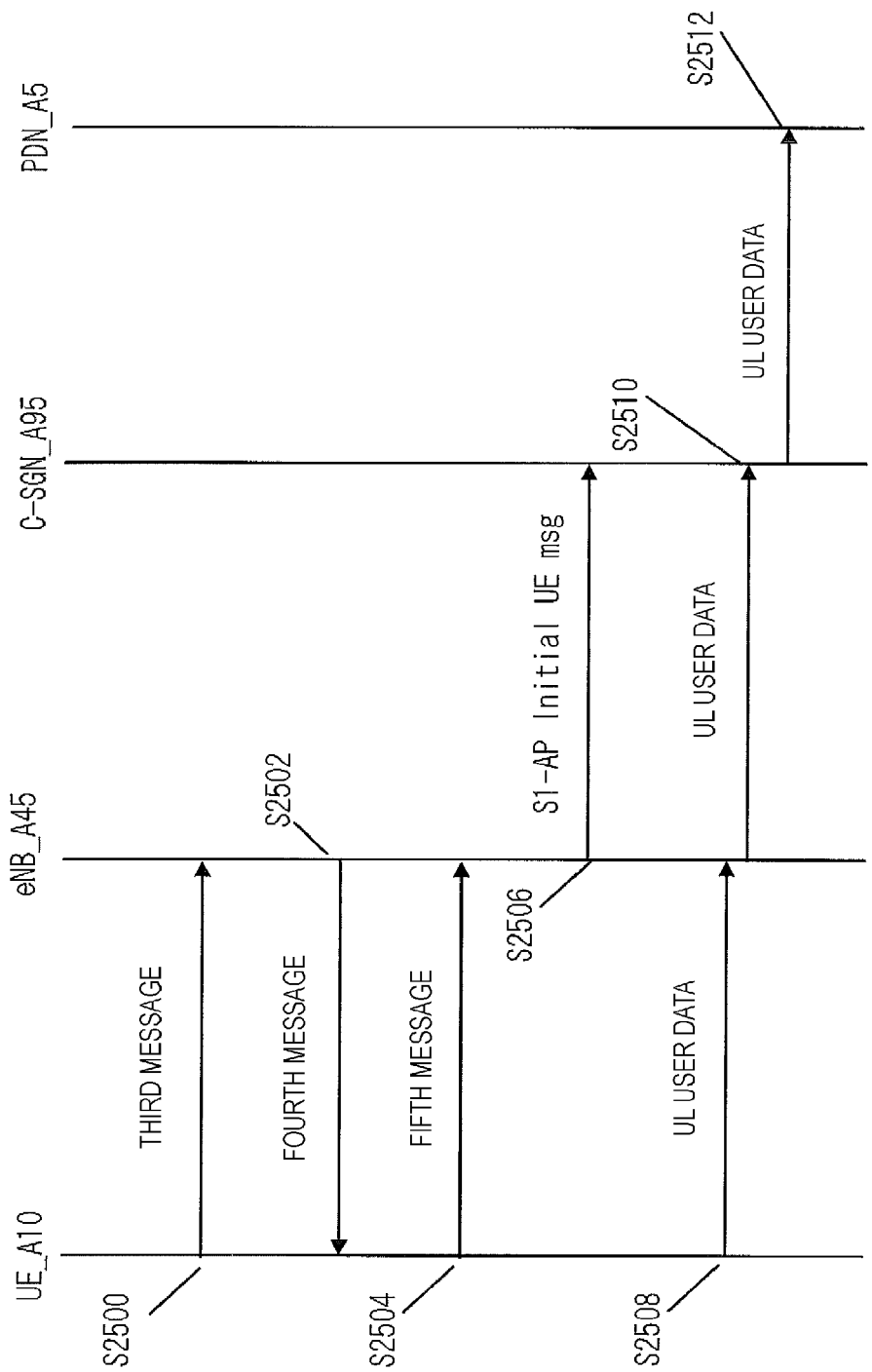
FIG. 5 is a diagram illustrating a second communication procedure.

Hereinafter, the second communication procedure example will be described in detail using FIG. 5.

The UE_A 10 receives the second message from the eNB_A 45, and transmits the third message to the eNB_A 45 (S2500).

The UE_A 10 transmits the third message not including the NAS message including the UL user data.

Note that in a case that the condition for including the NAS message including the UL user data is not satisfied when transmitting the third message described in the first communication procedure example, the UE_A 10 may transmit the third message not including the NAS message including the UL user data. The eNB_A 45 transmits the fourth message to the UE_A 10 (S2502). The fourth message is transmitted while including at least control information for the RRC connection.

Note that the fourth message is the RRC message, and may be an RRC Connection Setup message of a Message 4.

Note that the eNB_A 45 may transmit the fourth message to the UE_A 10 based on the third message not including the NAS message including the UL user data.

The UE_A 10 receives the fourth message, and transmits a fifth message (S2504). The UE_A 10 transmits a NAS service request message included in the fifth message. The NAS service request message is the NAS message, and a control message for requesting transition of the UE_A 10 to the active mode to the C-SGN_A 95.

The UE_A 10 transits to the active mode based on the reception of the fourth message or the transmission of the fifth message. In other words, the UE_A 10 establishes the RRC connection based on the reception of the fourth message or the transmission of the fifth message.

Note that the fifth message is the RRC message, and may be an RRC Connection Setup Complete message of a Message 5.

The eNB_A 45 receives the fourth message, and transmits the Initial UE message including the NAS service request message to the C-SGN_A 95 (S2506).

Thereafter, the UE_A 10 can transmit the UL user data using the connection. Note that the UL user data can be transmitted to the PDN_A 5 through the eNB_A 45 and the C-SGN_A 95 (S2508, S2510, and S2512).

Furthermore, the UE_A 10 can also receive DownLink (DL) user data using the connection. Note that the DL user data is transmitted from the PDN_A 5, and can be received through the C-SGN_A 95 and the eNB_A 45.

2. Modified Example

A program running on each of the mobile station device and base station device according to the present invention is a program that controls CPU and the like (a program for causing a computer to operate) in such a manner as to realize the functions according to the above-described embodiment of the present invention. The information handled by these devices is temporarily held in RAM at the time of processing, and is then stored in various ROMs or HDDs, read out by CPU as necessary, and edited and written. Here, a semiconductor medium (ROM, a non-volatile memory card, or the like, for example), an optical recording medium (DVD, MO, MD, CD, BD, or the like, for example), a magnetic recording medium (magnetic tape, a flexible disk, or the like, for example), and the like can be given as examples of recording media for storing the programs. In addition to realizing the functions of the above-described embodiments by executing loaded programs, the functions of the present invention are realized by the programs running cooperatively with an operating system, other application programs, or the like in accordance with instructions included in those programs.

In a case of delivering these programs to market, the programs can be stored in a portable recording medium, or transferred to a server computer connected via a network such as the Internet. In this case, the storage device serving as the server computer is also included in the present invention. Furthermore, some or all portions of each of the mobile station device and the base station device according to the above-described embodiment may be realized as LSI that is a typical integrated circuit. The functional blocks of each of the mobile station device and the base station device may be individually realized as a chip, or some or all of the functional blocks may be integrated into a chip. The circuit integration technique is not limited to LSI, and the integrated circuits for the functional blocks may be realized as dedicated circuits or a multi-purpose processor. Furthermore, in a case that advances in semiconductor technology, a circuit integration technology with which LSI is replaced appears, it is also possible to use an integrated circuit based on the technology. Additionally, although, for the above-described embodiments, LTE and WLAN (IEEE 802.11a/b/n, for example) have been described as examples of the radio access network, the connections may be made with WiMAX instead of WLAN. The embodiments of the invention have been described in detail thus far with reference to the drawings, but the specific configuration is not limited to the embodiments. Other designs and the like that do not depart from the essential spirit of the invention also fall within the scope of the patent claims.

REFERENCE SIGNS LIST

1 Communication system
5 PDN_A
10 UE_A
20 UTRAN_A
22 eNB (UTRAN)_A
24 RNC_A
25 GERAN_A
26 BSS_A
30 PGW_A
35 SGW_A
40 MME_A
45 eNB_A
50 HSS_A
55 AAA_A
60 PCRF_A
65 ePDG_A
70 WLAN ANa
72 WLAN APa
74 TWAG_A
75 WLAN ANb
76 WLAN APb
80 LTE AN_A
90 Core network_A
95 C-SGN_A
100 CIOT AN_A

The invention claimed is:

1. A User Equipment (UE) comprising:
transmission and/or reception circuitry configured to:
   transmit, to a core network, a request message including first identification information for requesting communication of a Non-Access Stratum (NAS) message including user data;
   receive, as a response to the request message, an accept message from the core network; and
   transmit the NAS message including the user data to the core network after receiving the accept message, and
a controller configured to detect that the communication of the NAS message including the user data is performable, based on second identification information that is associated with the communication of the NAS message including the user data and that is included in the accept message,
wherein
in a case of requesting a use of the communication of the NAS message including the user data, the UE passes the first identification information from a NAS layer in the UE to a Radio Resource Control (RRC) layer in the UE, and
the UE is a UE supporting a Cellular Internet of Things (CIoT)-related function.

2. A communication control method performed by a User Equipment (UE), the method comprising:
   transmitting, to a core network, a request message including first identification information for requesting communication of a Non-Access Stratum (NAS) message including user data;
   receiving, as a response to the request message, an accept message from the core network;
   detecting that the communication of the NAS message including the user data is performable, based on second identification information that is associated with the communication of the NAS message including the user data and that is included in the accept message; and
   transmitting the NAS message including the user data to the core network after receiving the accept message,
wherein
in a case of requesting a use of the communication of the NAS message including the user data, the UE passes the first identification information from a NAS layer in the UE to a Radio Resource Control (RRC) layer in the UE, and
the UE is a UE supporting a Cellular Internet of Things (CIoT)-related function.

* * * * *